US012687851B1

(12) United States Patent
Blanton, Jr. et al.

(10) Patent No.: US 12,687,851 B1
(45) Date of Patent: Jul. 21, 2026

(54) DIGITAL TWINS OF OPERATING SITES VIA AUTONOMOUS VEHICLES

(71) Applicant: RENU ROBOTICS CORP., San Antonio, TX (US)

(72) Inventors: Michael Odell Blanton, Jr., San Antonio, TX (US); Aldo Napoleon Ortega, San Antonio, TX (US)

(73) Assignee: RENU ROBOTICS CORP., San Antonio, TX (US)

( * ) Notice: Subject to any disclaimer, the term of this patent is extended or adjusted under 35 U.S.C. 154(b) by 0 days.

(21) Appl. No.: 18/217,449

(22) Filed: Jun. 30, 2023

Related U.S. Application Data

(63) Continuation-in-part of application No. 17/408,360, filed on Aug. 20, 2021.

(51) Int. Cl.
*G05D 1/00* (2024.01)

(52) U.S. Cl.
CPC ......... *G05D 1/0297* (2013.01); *G05D 1/0214* (2013.01)

(58) Field of Classification Search
CPC .... G05D 1/0297; G05D 1/0214; G05D 1/221; G05D 1/222; G05D 1/225
See application file for complete search history.

(56) References Cited

U.S. PATENT DOCUMENTS

| | | | |
|---|---|---|---|
| 5,204,814 A | 4/1993 | Noonan et al. | |
| 7,668,631 B2 | 2/2010 | Bernini | |
| 8,958,939 B2 | 2/2015 | Einecke et al. | |
| 9,026,299 B2 | 5/2015 | Johnson et al. | |
| 9,137,943 B2 | 9/2015 | Einecke et al. | |
| 9,173,343 B2 | 11/2015 | Bernini | |
| 9,848,529 B2 | 12/2017 | Franzius et al. | |
| 10,104,837 B2 | 10/2018 | Hashimoto et al. | |
| 10,321,625 B2 | 6/2019 | Einecke et al. | |
| 10,698,417 B2 | 6/2020 | Churavy et al. | |
| 10,824,163 B2 | 11/2020 | Einecke et al. | |
| 10,856,467 B2 | 12/2020 | Maggard | |
| 10,888,046 B2 | 1/2021 | Gorenflo et al. | |
| 2017/0108867 A1 | 4/2017 | Franzius et al. | |
| 2019/0302761 A1* | 10/2019 | Huang ................. | G02B 27/017 |
| 2021/0029873 A1 | 2/2021 | Yamauchi et al. | |
| 2021/0059112 A1 | 3/2021 | Kim | |
| 2021/0096574 A1 | 4/2021 | Lee et al. | |
| 2021/0123742 A1 | 4/2021 | Yang et al. | |
| 2021/0127569 A1 | 5/2021 | Gruhler et al. | |

(Continued)

*Primary Examiner* — Bao Long T Nguyen

(57) ABSTRACT

Disclosed are approaches for the centralized collection and sharing of "site-centric" data collected by one or more autonomous vehicles pertaining to an operating site for utilization by the site owner/operator in the performance of its supervisory functions at the operating site beyond (and even largely unrelated to) the immediate operations performed by the autonomous vehicle for which the sensing and detecting is performed. While the data collected and shared may be limited to sensing and detecting needed by the autonomous vehicle to complete its own specific tasks, additional sensors and detectors may be utilized solely for gathering additional information and data to support supervisory functions for the operating site. The autonomous vehicle's regular, extensive, and over-time repetitive traversals of the operating site makes it well-suited for collecting such additional data.

20 Claims, 13 Drawing Sheets

(56)          References Cited

U.S. PATENT DOCUMENTS

2021/0153428  A1      5/2021  Mittmann et al.
2021/0157327  A1      5/2021  Lee et al.
2022/0214685  A1*     7/2022  Tanaka ............... G02B 27/0179

* cited by examiner

100

200

200'

300

400

450

500

550

600

DIGITAL TWINS OF OPERATING SITES VIA AUTONOMOUS VEHICLES

CROSS-REFERENCE TO RELATED APPLICATIONS

This application is a continuation-in-part of, claims benefit of and priority to, and incorporates by reference herein in their entirety the following: U.S. patent application Ser. No. 17/408,360, filed Aug. 20, 2021, titled "COMMAND AND CONTROL CENTER FOR AUTONOMOUS VEHICLE OPERATIONS".

BACKGROUND

Outdoor operating sites require a relative degree of constant monitoring by the site owner/operator to ensure smooth and uninterrupted operations at the site that might otherwise be affected by a variety of negative factors such as weather, wildlife, vegetation types and growth rates, erosion, security measures, trespass detection, maintenance/repair issues, pollution, noise, status of routine upkeep, and/or defined activities (both expected and unexpected), to name a few. For most site operators, this generally requires a combination of surveillance/control infrastructure (security cameras, etc.) and supervising personnel (on-site and/or remote). However, these resources are costly and limited in functionality and effect.

SUMMARY

Various implementations disclosed herein are directed to the centralized collection and sharing of "site-centric" data collected at least in part by one or more autonomous vehicles, regularly operating at an operating site, for utilization by the site owner/operator in the performance of its supervisory functions, said data collected being beyond (and at least partially unrelated to) the immediate operations performed by the autonomous vehicle.

More specifically, disclosed herein are various implementations directed to systems, processes, apparatuses, methods, computer-readable instructions, and other implementations for the provision of centralized remotely-captured operating site data, collected at least in part by one or more autonomous vehicles operating at a first operating site, to a supervising entity for the first operating site, such various implementations comprising: receiving, from one or more autonomous vehicles operating at the first operating site, operating site data; populating a first data structure, representative of the first operating site, with the operating site data; and providing, to the supervising entity, usable access to the first data structure.

Several such implementations may further comprise one or more of the following features: capturing, at the autonomous vehicle, operating site data comprising a subset of data unrelated to operation of the autonomous vehicle at the first operating site, and transmitting the operating site data for inclusion in the first data structure, wherein said capturing and transmitting occur before said receiving; receiving, from one or more autonomous vehicles operating at the first operating site, autonomous vehicle data, then populating a second data structure, representative of the one or more autonomous vehicles, with the autonomous vehicle data, and then utilizing at least the second data structure to direct at least one action for at least one autonomous vehicle from among the one or more autonomous vehicles operating at the first operating site; enabling the supervising entity to add supplemental data to the first data structure; and/or enabling the supervising entity to modify the first data structure.

Certain such implementations may further feature: wherein a subset of the operating site data is unrelated to operation of the autonomous vehicle at the first operating site; and/or wherein at least part of the operating site data is captured by the autonomous vehicle utilizing a sensor that is not utilized to capture any portion of the autonomous vehicle data.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

Figure 1:
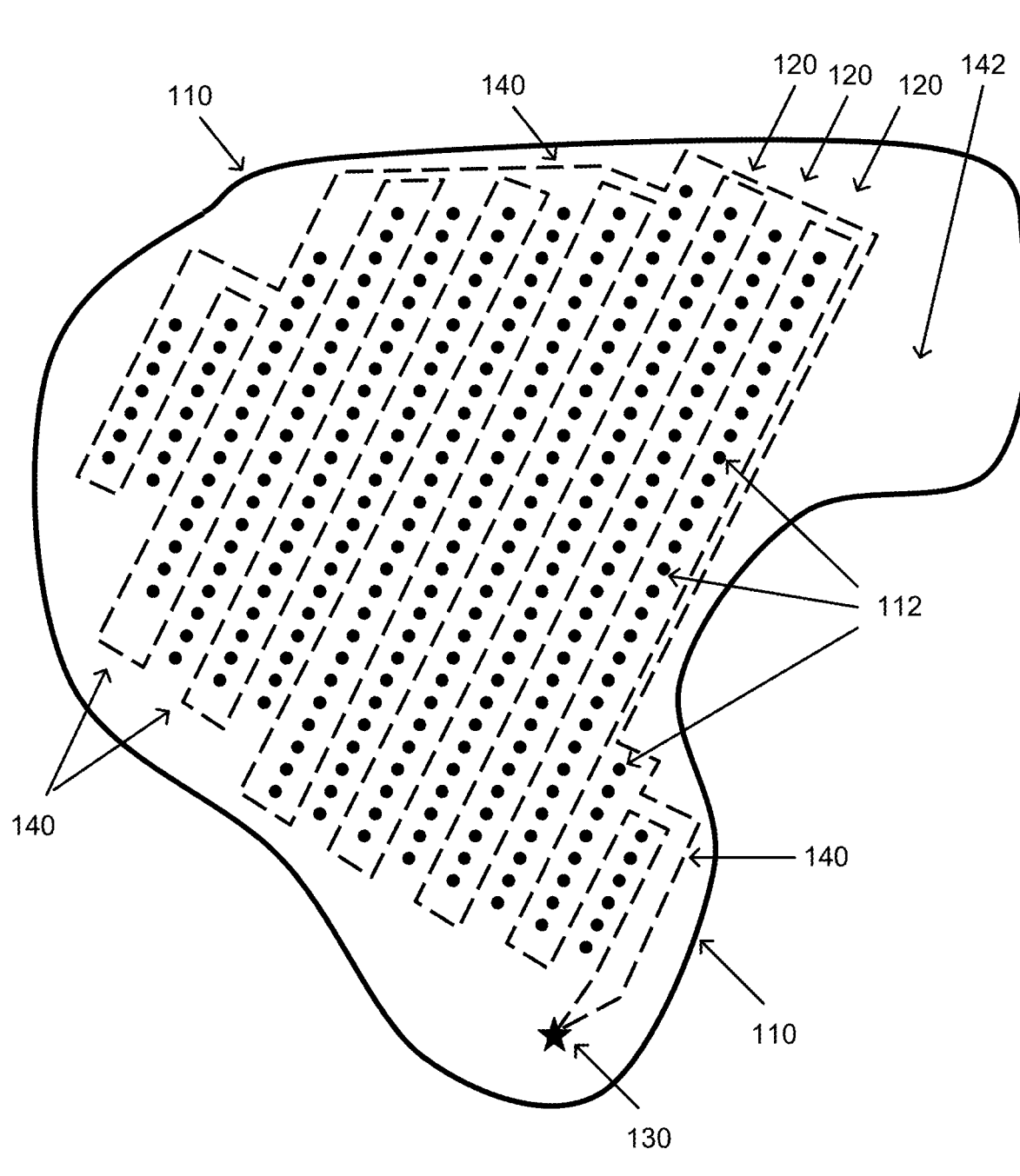
FIG. 1 is a general illustration of an exemplary operating site superimposed with a simple operational path plan for navigating among and between well-ordered obstacles of the operating site representative of the various implementations disclosed herein.

Outdoor operating sites—such as solar farms, wind farms, airports, golf courses, storage facilities, oil fields, electric tower line easements, and so on and so forth—require a relative degree of constant monitoring by the site owner/operator to ensure smooth and uninterrupted operations at the site that might otherwise be affected by a variety of negative factors such as weather (wind, rain, temperature, humidity, etc.), wildlife, vegetation types and growth rates, erosion, security measures, trespass detection, maintenance/repair issues, pollution, noise, status of routine upkeep, and/or defined activities (both expected and unexpected), to name a few. For most site operators, this generally requires a combination of surveillance/control infrastructure (security cameras, etc.) and supervising personnel (on-site and/or remote).

These outdoor operating sites also generally require ground maintenance, a need that has historically been met by groundskeeping personnel utilizing a variety of tools and/or operating simple machines for mowing and other vegetative control, for example. More recently, however, there has been an increase in the use of robotic mowers to meet these needs, and the advent and use of industrial-size autonomous vehicles configured for mowing have begun to make huge inroads into replacing expensive and inconsistent human resources with a cost-effective robot-based alternative.

In order to maneuver effectively, autonomous vehicles must actively and continuously sense and collect a substantial amount of data about the operating site using a variety of different sensors and detectors—information that is at least useful for, if not entirely redundant with, the information the site owner/operator needs in order to monitor the operating site for their own purposes. Yet contemporary robot mowers do not have anything but the most rudimentary capabilities when it comes to sharing the sensing and detecting data it gathers with a site owner/operator, at least in part because such autonomous vehicles and the corresponding site owners lack any kind of intermediary through which site data can be shared, accessed, updated, and proactively utilized. In other words, while sensing and detecting data collected at least in part by an autonomous vehicle might be gathered, centralized, and stored for performance management of said autonomous vehicle ("AV-centric"), collection and utilization of this data for performance management of the operating site itself by the site owner/operator ("site-centric") does not meaningfully exist today. As such, autonomous vehicles that are used to mow or conduct other on-site operations are today dramatically underutilized for site data collection otherwise useful for other site operation purposes.

Many operating sites could benefit from the utilization of autonomous vehicles such as, for example, large outdoor areas requiring vegetation maintenance or facilities such as solar farms where unchecked vegetation growth can be a hindrance or worse. For these kinds of locations, autonomous vehicles could provide valuable additional services such as inspections, site security, and environmental conditions, as well as many other services of particular relevance and benefit to the site owner/operator.

Accordingly, various implementations disclosed herein are directed to the centralized collection and sharing of "site-centric" data provided by one or more autonomous vehicles for utilization by the site owner/operator in the performance of its supervisory functions at the operating site beyond (and even largely unrelated to) the immediate operations performed by the autonomous vehicle.

While for some such implementations the data collected and shared may be limited to sensing and detecting needed by the autonomous vehicle to complete its own specific tasks, several other implementations may comprise additional sensors and detectors which are not necessary for the autonomous vehicle to perform its own specific tasks but which may be utilized solely for gathering additional information and data desired by the site operator/owner for their own utilization in the performance of their supervisory functions at the operating site and which merely takes advantage of the autonomous vehicle's regular, extensive, and over-time repetitive traversals of the operating site which makes the autonomous vehicle well-suited for collecting such additional information.

For these various implementations, the data itself is innovatively collected, organized, centralized, accessed, and later utilized in a "site-centric" fashion that, instead of focusing the data on its relation to the autonomous vehicle (or autonomous vehicles) that gather such information—which may still occur in parallel by the operator of the autonomous vehicle(s) for their own operations and other purposes—this data would instead by organized with a focus on the operating site (or multiple operating sites) as a "digital twin" of all data gathered at the site to provide a useful data model that is site-specific and focused for the benefit of its utilization by the site owner/operator in lieu of the site owner/operator gathering data from the site independently.

An understanding of various concepts is helpful toward a broader and more complete understanding of the various implementations disclosed herein, and skilled artisans will readily appreciate the implications these various concepts have on the breadth and depth of the various implementations herein disclosed. Certain terms used herein may also be used interchangeably with other terms used herein and such terms should be given the broadest interpretation possible unless explicitly noted otherwise.

For example, references made herein to active sensing systems, such as radar, are non-limiting and are merely exemplary and representative of any and all active sensing systems with no intention whatsoever to limit the disclosures herein to any specific active sensing system except where explicitly stated; instead, such references should be read as broadly as possible and inclusive of and equally applicable to any and all forms of active sensing systems. Likewise, any reference to a single passive sensing system such as thermal camera imaging (TCI) should be deemed a reference to any passive sensing system. Moreover, any reference to an active sensing system may also imply the alternative utilization of a passive sensing system, and vice versa, when technically feasible for producing the same outcomes, effects, or results.
Operational Sites and Sensing/Detecting FIG. 1 is a general illustration 100 of an exemplary operating site 110 logically bounded and populated with well-ordered obstacles 112 (here shown as a plurality of rows 120) representative of a typical operating site (also referred to an operating environment) for the various implementations disclosed herein. More specifically, in this example, the operating site is a large outdoor area, which may be bounded or unbounded by physical limits (i.e., no fences or other physical barriers defining the outer limits of the open space) but have corresponding logical boundaries defined by location data (e.g., a series of continuous location values that together provide an unbroken limitation to the operating site) corresponding to the area shown as the operating site 110 in FIG. 1.

The well-ordered obstacles 112 of FIG. 1 may be any physical object that might impact navigation of the autonomous vehicles—and, separately, may be objects that the site owner/operator may need to inspect on a regular basis. For example, each well-ordered obstacle 112 shown in FIG. 1 might correspond to solar panel post locations which, as illustrated in FIG. 1, form a plurality of rows 120 (which is not uncommon for a solar farm) and where the ability of an autonomous vehicle to navigate the operating site 110 for such a solar farm is at least limited by the location of the fixed solar panel posts as well as the solar panels themselves in certain configurations and orientations.

As shown in FIG. 1, the exemplary operating site 110 is superimposed with a simple operational path plan 140 for an autonomous vehicle to navigate among and between the well-ordered obstacles of the operating site representative of the various implementations disclosed herein. An autonomous vehicle may randomly navigate within the logical boundaries of the operation site 110 to detect and determined fixed reference locations for the solar panel posts 112 and develop the operational path plan 140 so as to navigate amongst and between the rows 120 formed by the posts 112. The autonomous vehicle may also sense and record data relevant to the site owner/operator—either inherently or intentionally—that is not necessarily relevant to operation of the autonomous vehicle, and the autonomous vehicle may even comprise one or more sensors for collecting data specifically for the site owner/operator that is not needed for operation of the autonomous vehicle.

As shown in FIG. 1, the operational path plan 140 may have the autonomous vehicle depart and return to a single fixed point 130 although in alternative implementations the start point and end point may be different, may be dynamic, may be random, and so forth. Notably, the operational path plan as shown is highly simplified for illustrative purposes only; a more extensive path plan is also anticipated based on the extensive disclosure of the parent applications to which priority is claimed and the contents of which have been incorporated herein by reference. This path may also be adapted and augmented specifically for the collection of data relevant to the site owner/operator—such as the addition of a path traversing the perimeter of the operating site 110 and/or traversal of the open area 142—but not necessarily otherwise relevant to operation of the autonomous vehicle.

For a solar site, for example, of particular relevance to a site owner/operator may be the condition and correct orientation of the solar panel assemblies on the site (among many other things).

Figure 2A:
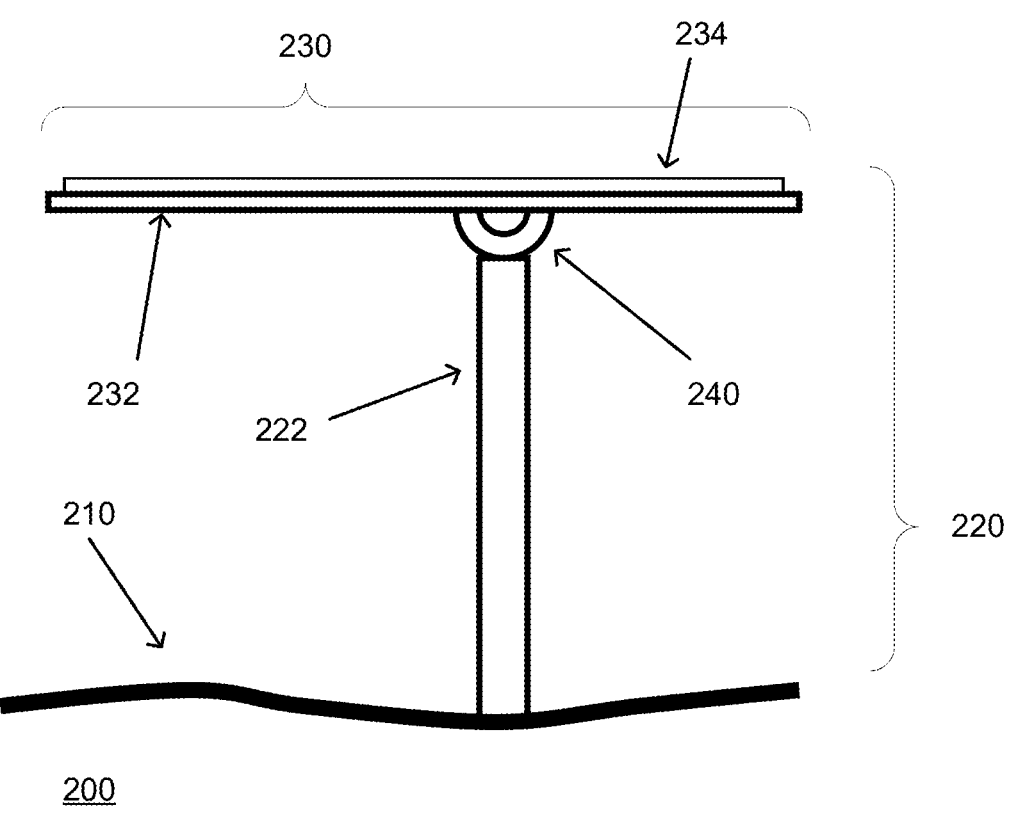
FIG. 2A is an illustration of an exemplary dynamic object—specifically, a solar panel fixed atop a solar panel post—that might exist in the operating environment illustrated in FIG. 1.

FIG. 2A is an illustration 200 of an exemplary dynamic object 220—specifically, a solar panel 230 fixed atop a solar panel post 222 via an orientable coupling 240—several of which might be emplaced in the ground 210 of the operating environment 110 illustrated in FIG. 1. The solar panel 230 may comprise a backing surface 232 and an energy capture surface 234 where the latter is purposefully highly absorbent (and minimally reflective) of electromagnetic energy generated by the sun to produce electrical power. Wires (not shown) carrying the produced electrical power from the solar panel 230 to an on-site collection/transmission facility (not shown in FIG. 2A or in FIG. 1) may run centrally down the post 222 and underground or, although not illustrated as such, may be provided overhead or in some other fashion.

As shown in the side view of the solar panel 230 and post 222 illustrated in FIG. 2A, the solar panel 230 may be oriented horizontally, with all edges equally distant above the ground 210, such as for collecting sunlight when the sun is directly overhead, for non-operating storage of the solar panel 230 at night or other low-light conditions, or to support cleaning or maintenance operations including those that might be undertaken by an autonomous vehicle such as an autonomous mower or a mobile maintenance vehicle.

It should be noted that while the orientable coupling 240 may be offset from the geometric center of the backing surface 232 of the solar panel 230 as shown in FIG. 2A (as well as in FIGS. 2B, 4B, and 5B, each described later herein), for alternative solar panels (not shown) the orientable coupling 240 may be geometrically centered on the backing surface 232. However, regardless of whether the orientable coupling 240 is centered or offset on the backing surface 232 of the solar panel 230, the orientable coupling 240—and, by extension, the location of the portion of the backing surface 232 to which the orientable coupling 240 is attached, as well as the corresponding portion of the energy capture surface 234—is, for most practical purposes, statically located in the same location as the solar panel post 222 to which the orientable coupling 240 is affixed. In other words, the orientable coupling 240, the portion of the backing surface 232 to which it is attached, and the corresponding portion of the energy capture surface 234 are always co-located with the solar panel post 222 to which the orientable coupling 240 is attached. As such, as long as the location and orientation of the solar panel 230 can be detected by an autonomous vehicle, it is possible to determine—as done by various implementations disclosed herein—the location of the corresponding post 222 even when such a post 222 cannot be directly detected by the autonomous vehicle.

Figure 2B:
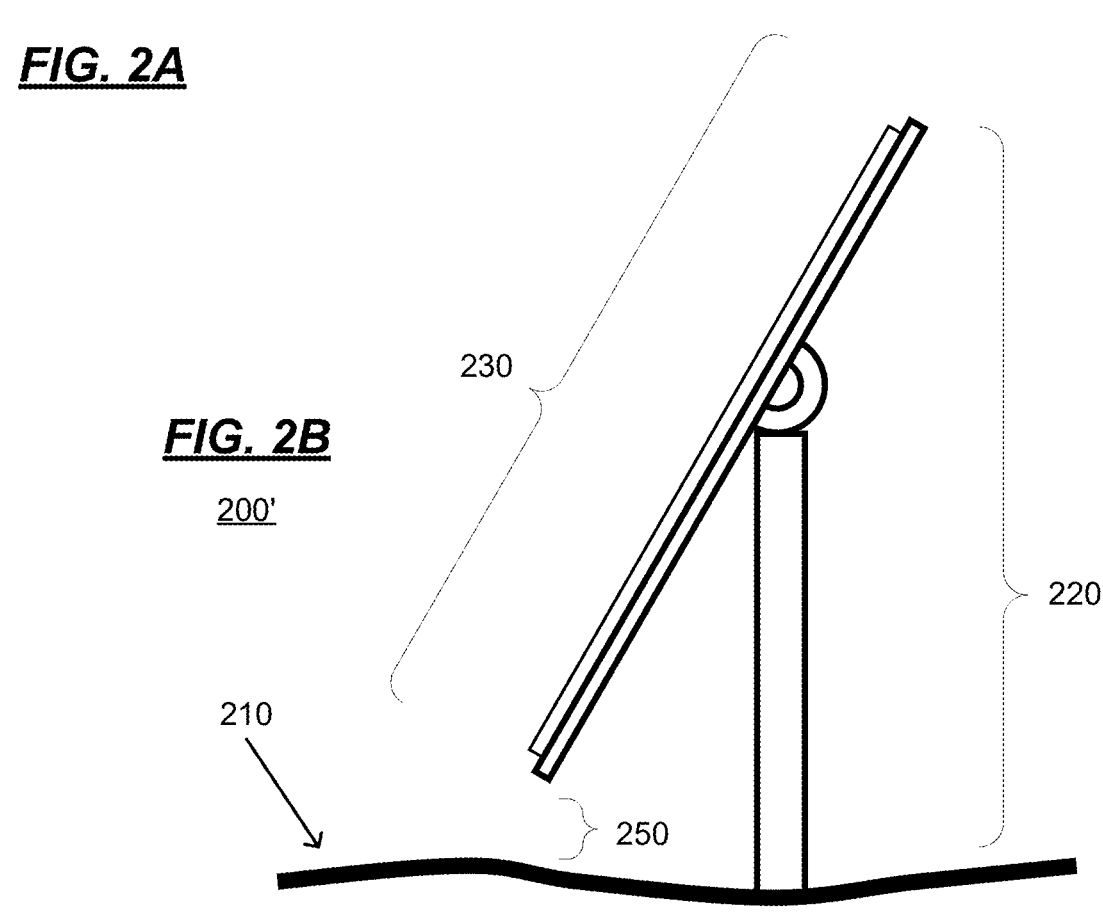
FIG. 2B is an illustration of the exemplary dynamic object of FIG. 2A in an alternate orientation whereby said dynamic object—specifically, the solar panel—may itself become an obstacle to navigation in the operating environment illustrated in FIG. 1.

FIG. 2B is an illustration 200' of the exemplary dynamic object 220 of FIG. 2A in an alternate orientation whereby said dynamic object 220—specifically, the solar panel 230—may itself become an obstacle to navigation in the operating environment illustrated in FIG. 1 because at least one edge of the solar panel 230 is at a reduced distance 250 above the ground 210 under which an autonomous vehicle—such as the tractor portion of an autonomous mower, if not the mowing deck itself—may be too high to pass underneath. Notably, it may be particularly relevant to a site owner/operator to know when a solar panel is oriented is not oriented in the position it is supposed to be oriented, such as being oriented akin to that shown in FIG. 2A when it should be oriented as shown in FIG. 2B, and this information can be readily provided by the autonomous vehicle based on sensing data relevant to its own purposes (e.g., mowing under the solar panel) but relevant to the site owner/operator for an entire different reason (e.g., orientation failure needing maintenance).

In addition to changing its angle relative to the ground 210, the solar panel 230 may also rotate from side to side (not shown) in order track the sun during its course through the sky. As is well-known and readily appreciated by skilled artisans, such lateral and vertical movements are common and desired for self-orienting solar panels 230 to maximize the exposure of the energy capture surface 234 and in turn maximize energy production. In this manner, the solar panel 230 constitutes a "dynamic object" insofar as it may or may not be an obstacle to an autonomous vehicle depending on its orientation at any given time, as well as because when oriented in a manner that it is an obstacle the solar panel 230 may be in different rotational positions vertically, laterally, or both and thus may constitute an obstacle in different locations at different times, thereby requiring real-time monitoring and determinations of whether the solar panel 230 is an obstacle (due to its orientation) as well as where that obstacle is actually located, albeit within a reasonable distance from the "fixed obstacles" represented by its associated post 222.

Figure 3:
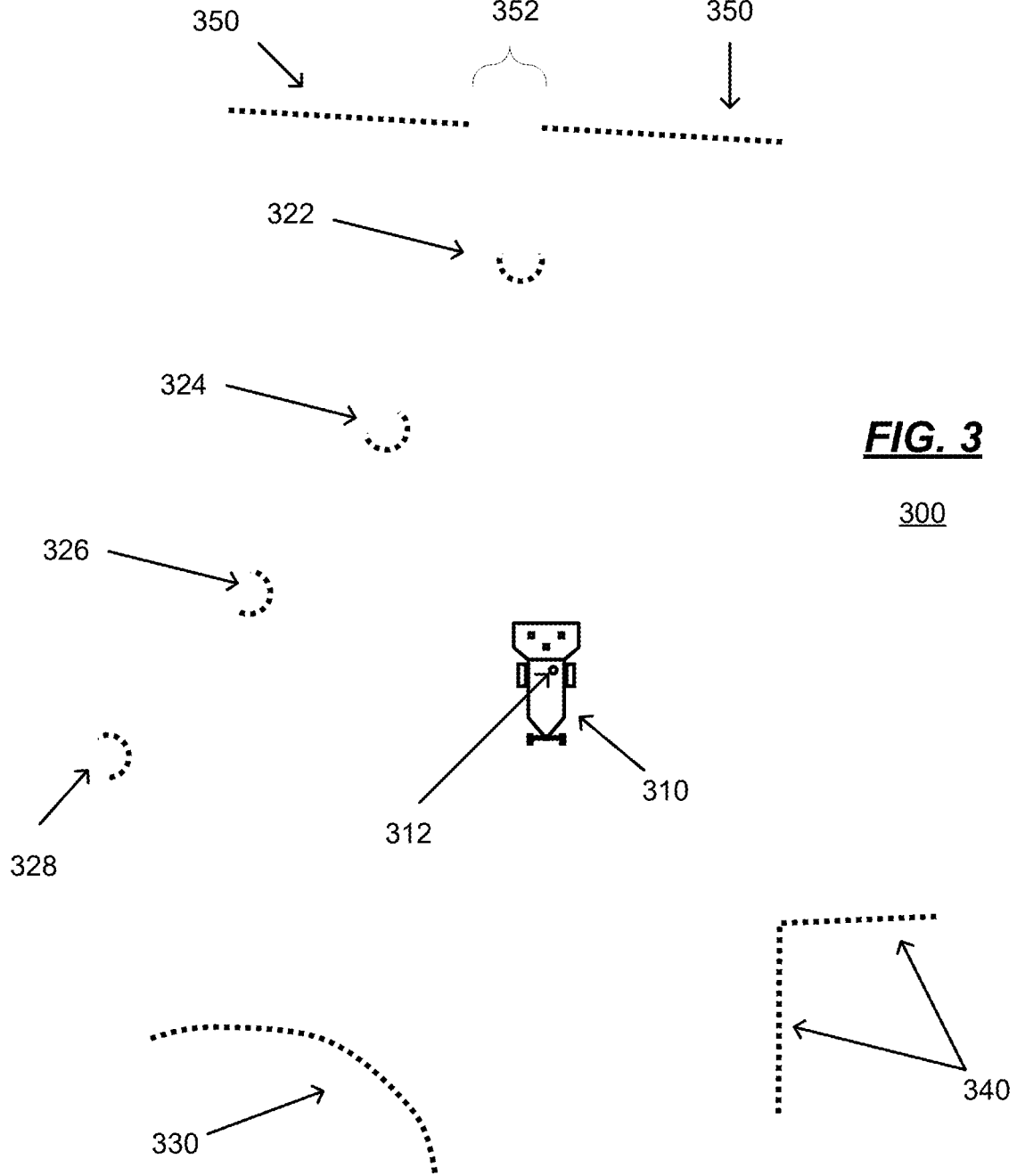
FIG. 3 is a diagrammatic illustration, representative of the various implementations disclosed herein, of an autonomous vehicle sensing for obstacles in its operating environment such as, for example, an autonomous mower using LIDAR to sense for solar panels, solar panel posts, and other obstacles on a solar farm said autonomous mower may be tasked to mow.

FIG. 3 is a diagrammatic illustration 300, representative of the various implementations disclosed herein, of an autonomous vehicle 310 sensing for obstacles and other features in its operating environment—including features of particular relevance to the site owner/operator whether or not they are relevant to operation of the autonomous vehicle—such as, for example, an autonomous mower using LIDAR 312 to sense for solar panels, solar panel posts, and other obstacles on a solar farm said autonomous mower may be tasked to mow. In FIG. 3, the autonomous vehicle 310 comprises LIDAR 312 as a detecting device with a known offset relative to the physical edges of said autonomous vehicle 310. Using LIDAR 312—and disregarding readings that correspond to navigable ground—the autonomous vehicle 312 detects the point location and distance of several physical objects including solar panel posts 322, 324, 325, and 328, the solar panels themselves (not shown but discussed in more detail with regard to FIGS. 4A, 4B, 4A, and 5B), a round obstacle 330 of some sort or fashion (such as a rock pile, for example), the corner and facing surfaces of a rectangular object 340 (which may be a building, a vehicle, a recharge station, etc.), and a flat well-like surface 350 partially obscured 352 from the LIDAR by a solar panel post

322 in its current location but detectable by subsequent sensing as the autonomous vehicle moves.

Although illustrated as a top-down 2D view, the data collected by the autonomous vehicle 310 using LIDAR 312 may be 3D and may range up from the ground to some angle and corresponding increasing height (e.g., 30-degrees). For a spinning LIDAR column comprising 16 vertically arranged laser emitting/detecting elements, for example, the LIDAR could collect 360-degree data from a 30-degree field in vertical increments separated by 2-degrees each and which—due to the motion of the autonomous vehicle 310, slightly altering the vertical angle of the LIDAR 312 by some mechanical means throughout the course of several subsequent and/or continuous 360-degree rotations (that is, "wobbling" the LIDAR column), or otherwise traversing the two-degree separation of the LIDAR elements during subsequent detection passes by some other means—provide data to fill in these two-degree gaps in sensing. This vertical gap-filling, as well as the naturally changing angles and view obtainable by the motion of the autonomous vehicle 310 as it traverses the operating site 110, can produce a comprehensive point cloud of the objects and potential obstacles located at the operating site 110 including solar panels 230 and solar panel posts 222.

Figure 4A:
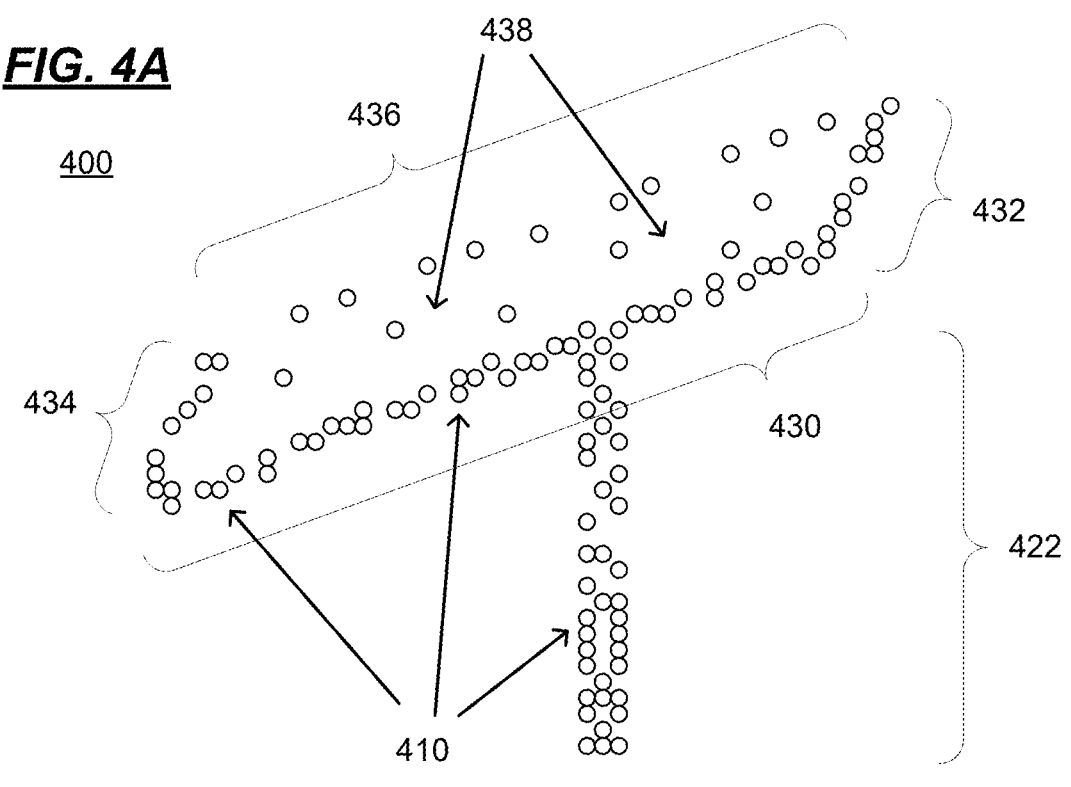
FIG. 4A is an illustration of exemplary detection of objects in an operating site—in this example, the LIDAR data points corresponding to a solar panel and post—representative of the various implementations disclosed herein.
Figure 4B:
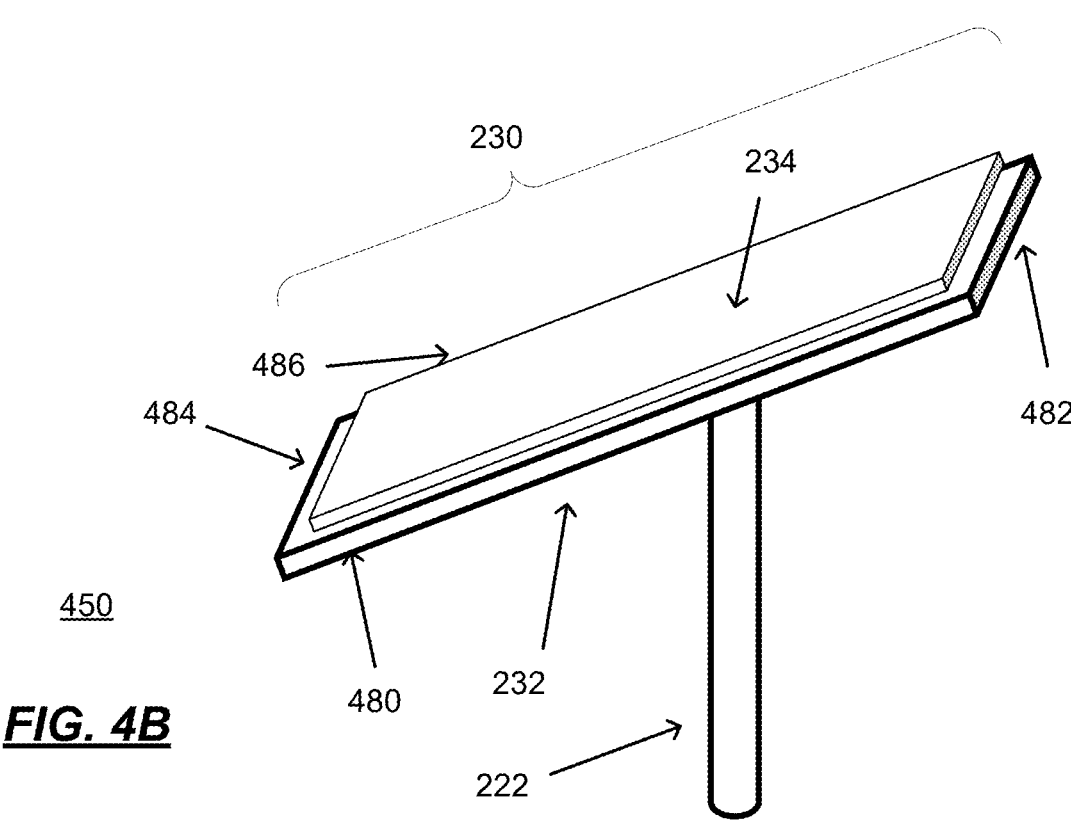
FIG. 4B is an illustration of the solar panel and post detected in FIG. 4A in a manner representative of the various implementations disclosed herein.

FIG. 4A is an illustration 400 of exemplary detection of objects at an operating site 110—in this example, LIDAR 312 data points 410 corresponding to the solar panel and post illustrated in FIG. 4B—representative of the various implementations disclosed herein. In FIG. 4A, the data points 410 coalesce around reflective vertical component 422 and reflective angled components 430, 432, and 434 as well as a detected but substantially non-reflective surface 438 extending to a determinable outer edge 436.

FIG. 4B is an illustration 450 of the solar panel 230 and post 222 detected in FIG. 4A in a manner representative of the various implementations disclosed herein. As shown in FIG. 4B, and with regard to FIG. 4A, the reflective vertical component 422 corresponds to the solar panel post 222 while the reflective angled components 430, 432, and 434 correspond to edges 480, 482, and 484 of the solar panel 230. Furthermore, the detected but substantially non-reflective surface 438 corresponds to the intentionally minimally-reflective (that is, intentionally maximally-absorptive) energy capture surface 234 including its outer edge 486.

Notably, if the solar panel 230 and its energy capture surface 234 was facing away from the LIDAR 312 such that the backing surface 232 was instead obliquely facing the LIDAR 312—that is, that the surface detected by the LIDAR 312 was instead the backing surface 232—the point cloud for this surface would be denser akin to how the edges 430, 432, and 434 comprise denser detection points. In this manner, the LIDAR data points 410 can be used to determine if the solar panel is facing the LIDAR or facing away from the LIDAR which, in turn, enables accurate location determinations for the lower edge of said solar panel which may constitute an obstacle to an autonomous vehicle (as discussed in detail elsewhere herein).

Figure 5A:
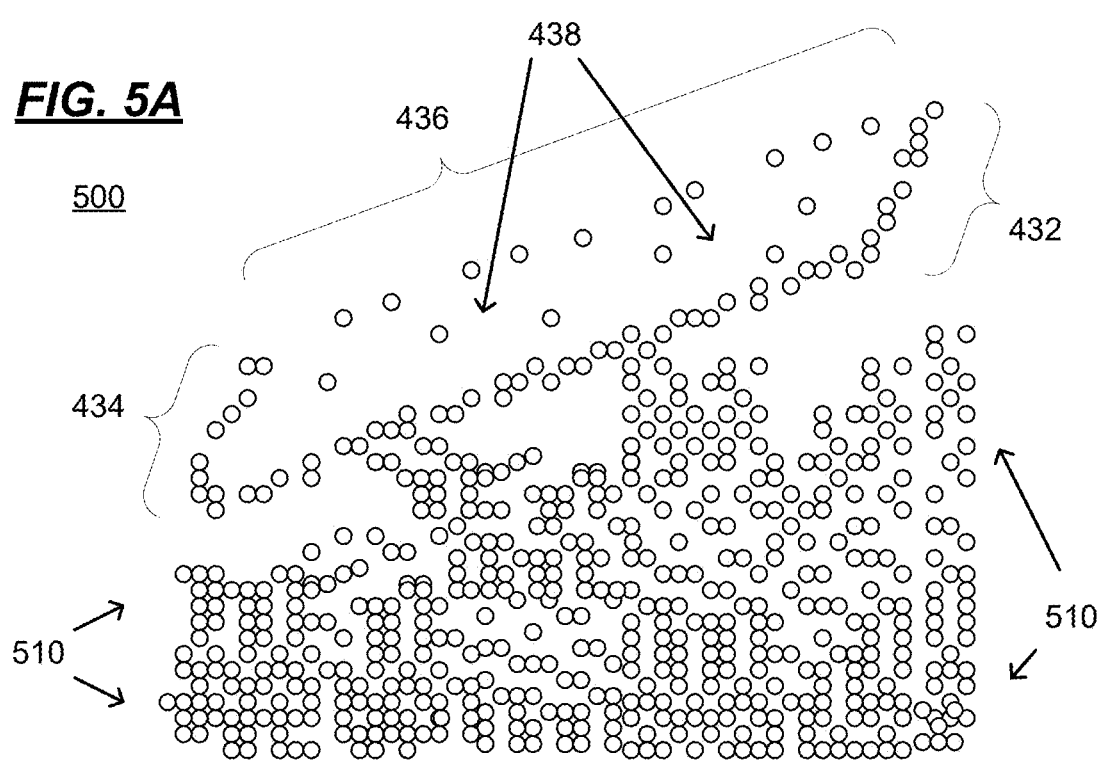
FIG. 5A is an illustration of exemplary detection of objects in an operating site obscured by vegetation growth—in this example, the LIDAR data points corresponding to a solar panel and post and the vegetation obscuring a solar panel post—representative of specific challenges that can be overcome by the various implementations disclosed herein.

FIG. 5A is an illustration 500 of exemplary detection of objects in an operating site obscured by vegetation growth—in this example, the LIDAR data points corresponding to a solar panel and post and the vegetation obscuring a solar panel post—representative of specific challenges that can be overcome by the various implementations disclosed herein. In FIG. 5 the LIDAR 312 data points 410 are similar to those detected in FIG. 4A except for the plethora of additional data points 510 detected beneath the reflective angled components 430, 432, and 434 and the non-reflective surface 438.

Figure 5B:
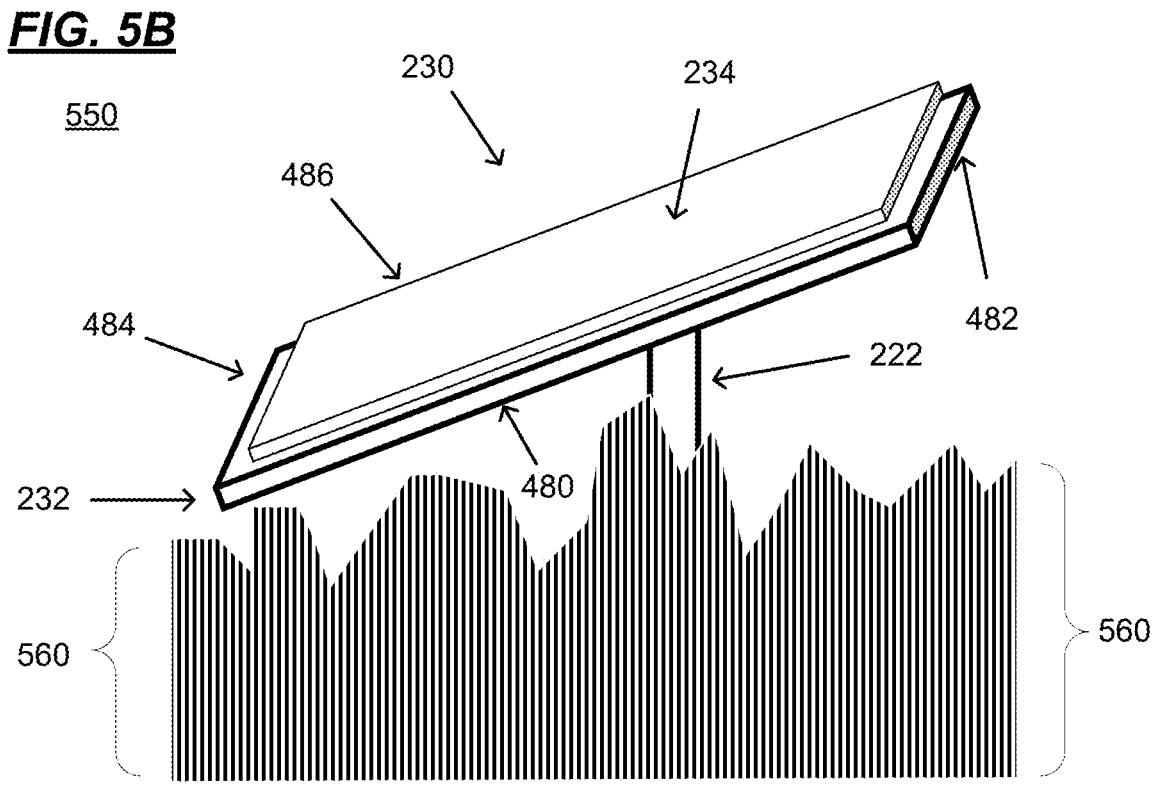
FIG. 5B is an illustration of the solar panel detected in FIG. 5A which can be used to determine the location of the solar panel post that cannot otherwise be directly detected, said determinations being undertaken in a manner representative of the various implementations disclosed herein.

FIG. 5B is an illustration 550 of the solar panel 230 detected in FIG. 5A and which can be used to determine the location of the solar panel post 222 that cannot otherwise be directly detected because of vegetation growth 560 that is obscuring and preventing detection of said post 222 but from which the location of said post 222 can still be determined based on the geometry of the solar panel 230, said determinations being undertaken in a manner representative of the various implementations disclosed herein and discussed in detail elsewhere herein.

"Digital Twin"

Various implementations disclosed herein are directed to the centralized collection and sharing of "site-centric" data collected by one or more autonomous vehicles, regularly operating at an operating site, for utilization by the site owner/operator in the performance of its supervisory functions, said data collected being beyond (and at least partially unrelated to) the immediate operations performed by the autonomous vehicle.

Figure 6:
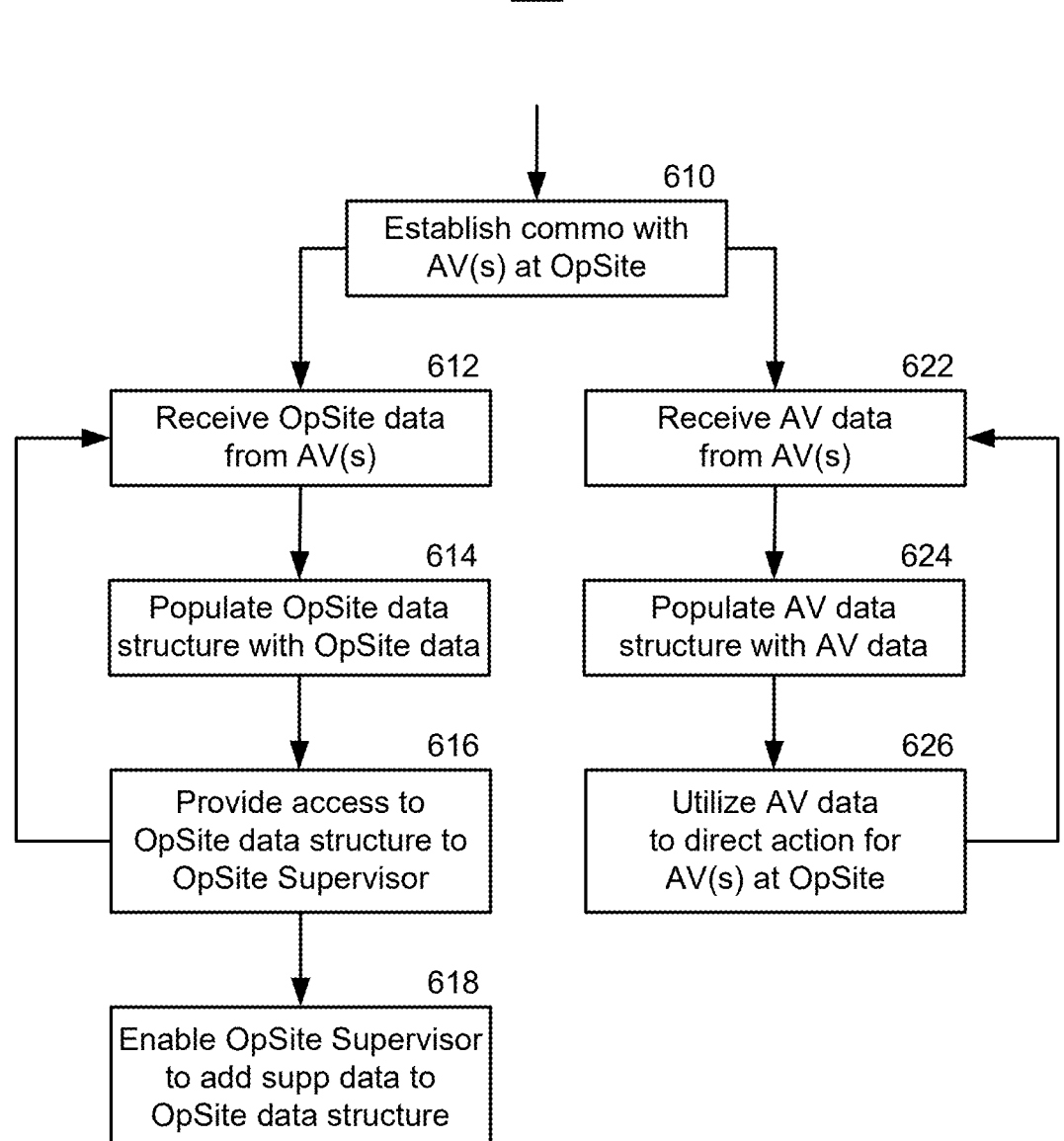
FIG. 6 is a process flow diagram, representative of the various implementations disclosed herein, illustrating an approach for the provision of centralized remotely-captured operating site data, collected by one or more autonomous vehicles operating at a first operating site, to a supervising entity for the first operating site.

FIG. 6 is a process flow diagram 600, representative of the various implementations disclosed herein, illustrating an approach for the provision of centralized remotely-captured operating site data, collected by one or more autonomous vehicles operating at a first operating site, to a supervising entity (designated by the site owner/operator) for the first operating site. In FIG. 6, at 610 a centralized data system (or equivalent) establishes communication with the autonomous vehicle(s) (AV(s)) at the operating site (OpSite). At 612 the system receives OpSite data from the AV(s), and at 614 the system populates an OpSite data structure with the OpSite data. At 616 the system provides the OpSite Supervisor (acting on behalf of the site owner/operator) with access to the OpSite data structure and, for certain implementations, at 618 the system may also enable the OpSite Supervisor to add supplemental data to the OpSite data structure.

Meanwhile, in parallel or otherwise, at 622 the system may also receive autonomous vehicle (AV) data—that is, data specifically relevant to the operation of the AV including relevant data regarding the operating site, the vehicle itself, environmental conditions, and so forth—and at 624 the system may populate an AV data structure with the AV data such that, at 626, the system can then utilize the AV data to direction action for the AV(s) at the OpSite. Notably, these processes may be performed iteratively and cyclically such that the OpSite data structure is being continuously updated with new or real-time OpSite data received from the AV(s) while the AV data structure also may be similarly continuously updated with new or real-time AV data received from the AV(s).

As such, various implementations disclosed herein are directed to the provision of centralized remotely-captured operating site data, collected by one or more autonomous vehicles operating at a first operating site, to a supervising entity for the first operating site, such various implementations comprising: receiving, from one or more autonomous vehicles operating at the first operating site, operating site data; populating a first data structure, representative of the first operating site, with the operating site data; and providing, to the supervising entity, usable access to the first data structure.

Several such implementations may further comprise one or more of the following features: capturing, at the autonomous vehicle, operating site data comprising a subset of data unrelated to operation of the autonomous vehicle at the first operating site, and transmitting the operating site data for inclusion in the first data structure, wherein said capturing and transmitting occur before said receiving; receiving, from one or more autonomous vehicles operating at the first operating site, autonomous vehicle data, then populating a second data structure, representative of the one or more autonomous vehicles, with the autonomous vehicle data, and then utilizing at least the second data structure to direct at least one action for at least one autonomous vehicle from among the one or more autonomous vehicles operating at the first operating site; enabling the supervising entity to add supplemental data to the first data structure; and/or enabling the supervising entity to modify the first data structure.

Certain such implementations may further feature: wherein a subset of the operating site data is unrelated to operation of the autonomous vehicle at the first operating site; and/or wherein at least part of the operating site data is captured by the autonomous vehicle utilizing a sensor that is not utilized to capture any portion of the autonomous vehicle data.

Autonomous Vehicle Operations

Various implementations disclosed herein relate to autonomous vehicles (or "robots") such as, for example, mobile maintenance robots, autonomous mowers, or other such vehicles and devices that might be utilized for any purpose such as, for example, maintenance operations at renewable energy installations. Even in this narrow but representation example, however, such maintenance operations may include a diverse range of activities and tasks including without limitation mowing, spraying for pests, spraying insecticides, washing of solar panels, security monitoring of the area, replacement of failed components, or other maintenance operations including but not limited to inspections of combiner boxes, wire connections, or infrastructure (including solar panels), and where any such "inspections" may be with performed with multispectral cameras capturing image data within specific wavelength ranges across the electromagnetic spectrum.

For the various implementations herein disclosed, an autonomous vehicle may comprise a variety of sensors, such as (but not limited to) LIDAR (light detection and ranging), RADAR (Radio Detection and Ranging), IMU (inertial measurement unit), inertial navigation systems, temperature sensors, humidity sensors, noise sensors, accelerometers, pressure sensors, GPS (global positioning system), ultrasonic sensors, cameras or other sensors. LIDAR may include, in some examples, 3D laser scanning, or a combination of 3D scanning and laser scanning. The autonomous vehicle may implement autonomous navigation to traverse a work area using sensors for collision avoidance and adjusting routing as needed. The autonomous vehicle may be communicatively connected to a central management system through a GPRS (General Packet Radio Service) network or other cellular data network or cell-based radio network technology mobile network, an IEEE 802.11x wireless network or any other network modality. Any number of networks (of the same or different types) may be present and used in any combination suitable for performing any one or more of the methodologies described herein.

An autonomous vehicle representative of various implementations disclosed herein may make a 3D measurement of the operating site using LIDAR and/or other vehicle-mounted sensor(s) to yield data in the form of a point cloud, for example, containing position of various points in the environment relative to the sensor (e.g. solar panel surface, solar array support structure, ground, grass, other vegetation, people, buildings, animals, etc.).

Single frame measurements for many sensors including LIDAR may not provide sufficient information to distinguish the target object (such as solar panels) from other objects in the environment. However, by aggregating sensor data as the vehicle moves a clearer representation of the environment can be obtained that can help fill in gaps in the measurements. Sensors such as many types of LIDAR can have large gaps between individual measurement points that are fixed relative to the sensor by moving the sensor. Moving the sensor can also provide close-up measurements of distant locations which can then be connected together via aggregation. While measurement performance can decline quickly as distance from the sensor increases, moving the sensor allows the environment to be observed from multiple locations and at a smaller distance for objects of interest toward which the autonomous vehicle can move. The foregoing notwithstanding, however, it should be noted that nothing herein precludes the use of single frame measurements as sources for object detection by the various implementations herein disclosed.

When the measurements are sufficiently aggregated, the points associated with the panels can be segmented (separated) from the rest of the points. Multiple known methodologies can be used to do this, from using a simple height threshold (i.e., selecting all points above a certain height) to fitting mathematical planes to the data and removing outlying points (i.e., those that are far from the plane.) In this manner, the likelihood of misattributing points to the panels can be mitigated. In addition, removal of points associated with the ground is important to avoid mis-fitting planes to the data.

To fit the planes to the data, these mathematical planes—defined by a point on the plane and a 3D vector that is in a direction normal to the plane—can be fit to the remaining data. Random Sample Consensus (RANSAC) can then be used to find multiple distinct, non-co-planar, planes in a data set. Each plane with a minimum number of associated valid measured points, of course noting that any three points that are not all collinear can define a plane, and therefore requiring a much higher number of points are needed to ensure that the points correspond to a true approximately planar surface in the environment.

After identifying the points associated with distinct planes, the orientation of the panels can be determined based on the tilt and alignment of the panels based on the direction of the long edge using a combination of methods which might include detecting the edge directly, finding the major axis of the points associated with the panels, and/or using additional a priori data about the installed orientation of the panels. The cross-row extents of the panels are then determined by identifying the edges of the panels in the data in the cross-row direction. The a priori known size/shape of the panel sections can be used to refine these measurements. Finally, the centerline is fit to the center of the extents and aligned with the panels.

When a solar panel is movable and the pivot point is offset from the top surface of the panel, the centerline can be moved to the pivot based on the known geometry of the panels. Although this adjustment might only change the position estimate by a small amount, this offset may be crucial for yielding the desired positioning precision of the autonomous vehicle, such as an autonomous mower, to get complete mowing coverage of the site without running into structures on the site.

Finally, the panel detection may then be used to determine the position of the autonomous mower relative to a row of solar panels. This measurement can be used in two ways: (1) to ensure that the autonomous vehicle (or "robot") maintains a safe distance from the structures; and (2) to provide a high precision measurement of lateral position (cross-row positioning) when GPS is unavailable and/or real-time kinematic (RTK) corrections or other utilized positioning methods are unreliable. Therefore, by creating a map that stores the georegistered centerlines of the panels, the live measurements can be compared to the centerlines in the map and used to offset the estimated position of the autonomous vehicle based on map data versus detected data.

Notably, for the various implementations disclosed herein, the base station position need not be globally accurate, but only that measurements made by a subsequent base station be reconciled to the measurements made by previous base stations (including the initial base station) with global accuracy being a convenient reference but not a necessary one. Stated differently, numerous alternative local- and wide-area augmentation methods exist such as, for example, the use of RTK with a local base station, as well as various approaches using Satellite Based Augmentation Systems (SBAS) that may utilize networks of base stations for generating corrections to improve accuracy. Each of these additional or alternative approaches can be both precise and accurate, although many such high accuracy systems or services can entail expensive hardware, subscription services, and/or nontrivial setup procedures. Accordingly, while local accuracy/precision is relevant, global accuracy is not as relevant, so an inaccurately surveyed base station (providing RTK corrections) that can be setup in a matter of minutes and requires only modestly priced hardware may be sufficient for site-based positioning and will continue to suffice so long as the base station is not moved. Once the base station is moved, however, measurements that were made relative to the inaccurately surveyed base station are no longer usable but can be made useable again by adjusting the assumed ("surveyed") position of the base station in a manner that minimizes the error of the surveyed points—that is, where several known unique points measured with the original base station location are again measured with a new base station in its new location. The difference between the measurements of such known, unique points can then be used to logically "shift" the assumed position of the base station. As such, the new base station is not physically moved but only its assumed surveyed position is changed to conform to the original survey as a frame of reference. After making this logical shift, the measurements made on the site can be reconciled with the measurements made with the original base station.

Autonomous Vehicle Navigation

One way of establishing a route for an autonomous vehicle to achieve complete coverage is to manually drive the route with the autonomous vehicle so that it can record the route and later repeat the traversal of said route. However, this method of training relies on the operator to select the route that the vehicle will follow and, in addition to the human effort required, the route selected by the operator may not be the most efficient route for the vehicle overall or in different operating conditions.

Alternative approaches to route development may be based on simultaneous localization and mapping (SLAM) techniques. SLAM provides the capability to generate a map without human intervention combined with the ability to localize within this map, and self-localization of the autonomous vehicle can be performed even if the process of generating the map is still in progress. On the other hand, SLAM techniques work well in indoor environments where there are a lot of features and well-defined physical boundaries. In unbound outdoor environments, however, there are fewer navigational features for SLAM to reference thus making SLAM substantially less effective. Of course, while the terms "mapping" (i.e., locations of objects within an environment) and "positioning" (i.e., determining a location within an environment based on a map) might be distinguishable from "routing" (i.e., choosing a navigational path within an environment), these various terms are closely related and may be used interchangeably herein consistent with the idea that that navigating through an environment (i.e., following a route) requires an autonomous vehicle to know its location within the environment.

To help compensate for the shortcomings of SLAM, some autonomous mowing systems utilize a boundary wire to surround a mowing area and emit a weak electromagnetic signal that can be detected by the autonomous mower. While systems that use boundary wires may help increase the efficacy of SLAM, they have their own shortcomings. For example, defining a mowing area requires installing the boundary wire, which may be impractical for the large, remote areas on which renewable energy farms are often located. Similarly, redefining existing mowing areas requires reinstalling new wire in a new pattern, which again is impractical for many renewable energy farms. As such, while the use of a boundary wire may be suitable for relatively small residential and small business environments, it is not suitable for utilization on a larger scale such as energy production sites.

It is possible to guide an autonomous vehicle with GPS-based localization along paths and routes. Paths are generally lines of travel which are defined in a way to allow the vehicle to safely traverse near and around static obstacles in the operating space. A path is considered to be a line that exists in real world space between two GPS coordinate points, and a path may have a start point and an end point defined by GPS coordinates (or other equivalents). A path can be either straight or curved, and is typically definable by some mathematical geometric construct such as a line or curve in two-dimensional space for example. As used herein, "GPS coordinates" or other coordinate-specific examples are exemplary only and should be understood to include any and all alternate coordinate sources such as other WGS84 coordinates (as used by GPS), any of the several known Cartesian coordinate frames, or other coordinate systems without limitation.

A path is used by the autonomous vehicle as a guide for driving. As the vehicle traverses along the path, the vehicle compares its position via GPS coordinates to the path and makes corrections as necessary to follow the path as accurately as the mechanical capabilities and/or precision of the sensors of the vehicle will allow. The autonomous vehicle may also incorporate other techniques to follow a path such as LIDAR-based localization and inertial navigation/dead reckoning (particularly in areas where GPS is unavailable or unreliable). For example, the panel-and-post (P&P) detection/localization methods described herein may be used as a specific implementation that utilizes LIDAR-based localization. Routes are considered to be a collection of paths, which are interconnected at nodes, where the nodes are either endpoints or intersection points between paths.

For example, certain implementations disclosed herein may utilize approaches for determining optimized task-specific routes such as mowing routes for an autonomous mower. Such implementations may use information about a site to automatically plan a mowing route for transit to and from a mowing region and the actual mowing of the region. Site information may include, for example, overhead/aerial/satellite imagery; CAD, blueprint or similar data that provides precise geometry and location of structures; data, such as from cameras, LIDAR, or other sensors that has been recorded on site using either sensors on the autonomous vehicle, or data from other sensors, such as from a survey-grade laser scan or a purpose-built data collection system; manually or automatically generated region, route or path information that explicitly indicates areas to drive and/or mow; and/or manually or automatically generated annotations or metadata to site data (of any type).

For some implementations, a mowing route may include two components: transit sections and mowing sections. Transit sections are paths where the autonomous mower moves from one area to another without mowing, and mowing sections are areas where the autonomous mower mows vegetation (e.g., has its cutting mechanism running). The mowing route may be optimized for distance, energy efficiency, and/or fastest effective mow rate (taking into consideration transit and recharge times) or other criteria.

Select implementations may also utilize a route network with annotated mowing regions, said route network including geometric or geographical points and connections between points along with relevant annotations or metadata. Any of several existing route-finding algorithms can be used with the route network to systematically find routes from one point to another within the network. Moreover, route-finding algorithms can solve for routes that optimize a specific metric (such as route length) when more than one viable route exists and multiple metrics are available from which to select.

In some instances it may be possible to predefine routes that provide full mowing coverage in mowing regions; however, such routes may not accommodate differences in the vehicle (such as if a smaller mower deck is used than when the original routes were created) or in the mowing parameters (such as if the desired path overlap changes). Additionally, in cases where mowing is performed in repetitive patterns (such as along multiple parallel rows), and where there is more than one entrance/exit to a mowing region (such as at both ends of a row of solar panels), the optimal entrance to a region and exit from a region may vary based on where the autonomous mower starts.

In addition, multiple methodologies can be used to generate a full route that includes an arbitrary number of transit regions and mowing regions. For example, one approach might minimize the total distance traveled (transit distance plus mowing distance) where the order in which the mowing regions are sequenced may be determined automatically. Another approach might sequence the mowing regions in a specified order where the length of transit is minimized or, in some alternative implementations, determined on-the-fly based on the entry/exit points of the regions.

For specific implementations, the paths to achieve full mowing coverage of a mowing region may be stored in a data store or, alternatively, computed on-demand (or on-the-fly) so as to achieve full coverage of the mowing region. For other implementations, the paths that are within the mowing region and the corresponding mow pattern—that is, the order in which the mow paths are traversed—may be computed on-demand or on-the-fly.

GPS/GNSS

Various implementations herein disclosed utilize GPS and/or other GNSS system for navigation and to support mapping of an operation site, and several such implementations may utilize more than one such GNSS and/or make use of multi-frequency receivers that support multiple or all of the deployed GNSS constellations.

A global navigation satellite system (GNSS) is a satellite navigation system with global coverage such as, for example, the U.S. Global Positioning System (GPS). Other examples of GNSSs include Russia's Global Navigation Satellite System (GLONASS), China's BeiDou Navigation Satellite System (BDS), and the European Union's Galileo system.

GPS provides geolocation and time information to a GPS receiver anywhere on or near the Earth where there is an unobstructed line of sight to a plurality of satellites—generally requiring at least three for basic location determinations and at least four to include an altitude determination—with greater accuracy being achievable with the inclusion of additional satellites (that is, more than four satellites) when possible. Satellite-emitted GPS signals are relatively weak, however, and can be easily blocked by mountains, buildings, or other obstacles, although this can also mitigated by the inclusion of additional satellites when possible.

High accuracy GPS/GNSS receivers can be used in many applications for high-accuracy, high-precision guidance of autonomous vehicles, and some implementations of high-accuracy GPS utilization may be supplemented by real-time kinematic (RTK) corrections. However, there are a number of common conditions that can result in degradation or complete unavailability of GPS signals when the GPS antenna's view of the sky above is blocked and a minimum number of satellites necessary for GPS positional determinations are not available. For example, such conditions can be common when operating in and around solar arrays, and particularly whenever driving underneath such arrays, where solar panels are elevated and reside atop posts having a substantially smaller footprint on the ground than the solar panels themselves. Therefore, in order to ensure continuous, reliable location determinations when GNSS measurements are lost or rendered inaccurate, other methods for localization are required.

Except where expressly stated otherwise, references made herein to GPS are non-limiting and are merely exemplary and representative of any and all GNSSs with no intention whatsoever to limit the disclosures herein to GPS alone; instead, such references should be read as broadly as possible and inclusive of and equally applicable to any and all GNSSs. Moreover, any reference to a single GNSS system—and in particular any reference to GPS—should be deemed a reference to any GNSS individually, combinations of GNSSs, or all GNSSs collectively.

Real-Time Kinematics (RTK)

Real-time kinematic (RTK) positioning is the application of surveying to correct for common errors in current satellite navigation (GNSS) systems. RTK uses measurements of the phase of the signal's carrier wave in addition to the information content of the signal—relying on a single reference station or an interpolated virtual station for real-time corrections—for providing enhanced accuracy to GNSS-based location determinations. With reference to GPS in particular, RTK positioning is commonly referred to as carrier-phase enhancement or carrier-phase GPS (CPGPS).

RTK systems may use a single base station receiver (BSR) to service a number of mobile units (e.g., autonomous vehicles). The BSR re-broadcasts the phase of the carrier that it observes, and each of the mobile units compare their own phase measurements with the one received from the BSR to determine an accurate distance and direction from the BSR which can then be used by the mobile unit to refine GPS determinations for of its own location (at least relative to BSR). This approach enables mobile units to calculate their relative position very precisely, although the absolute position determination is accurate only to the same accuracy as the computed position of the BSR which may be precisely accurate when the BSR is located at a known surveyed location (e.g., a fixed survey benchmark), which in turn enables mobile units to produce a highly accurate map using location fixes relative to that surveyed location. But even without survey, RTK provides highly accurate relative position/location determinations useful to any of the several implementations herein disclosed, and especially in applications for determining the location of an autonomous vehicle with very high accuracy.

More specifically, RTK is a differential GNSS technique based on the use of carrier measurements and the transmission of corrections from the base station, whose location is well known, to a mobile unit (or "rover") so that location errors effectively cancel out. RTK is based on the several high-level principles: (1) in a clean-sky location, the main errors in the GNSS signal processing (satellite clock bias, satellite orbital error, ionospheric delay, and tropospheric delay) are constant in such a location and therefore cancel out when differential processing is used as between two or more receiving stations (the RTK base station and one or more mobile units); (2) the "noise" of carrier measurements is smaller than the noise of pseudo-code measurements; and (3) although additional processing of carrier measurements is needed due to carrier phase ambiguity, this can be readily addressed for dual-frequency differential measurements using two closely-located receivers.

In general, the range is calculated by determining the number of carrier cycles between the satellite and the mobile units, then multiplying this number by the carrier wavelength. However, the calculated ranges still include errors from such sources as satellite clock and ephemerides, as well as ionospheric and tropospheric delays. To eliminate these errors, and in view of the carrier-based measurements, the RTK base station transmits its measurements to its mobile units where "ambiguity resolution" is performed by each mobile unit to determine its position using algorithms that incorporate ambiguity resolution and differential correction. The position accuracy achievable by the rover depends on, among other things, its distance from the base station (referred to as the "baseline") and the accuracy of the differential corrections. Corrections are as accurate as the known location of the base station and the quality of the base station's satellite observations. Site selection is important for minimizing environmental effects such as interference and multipath, as is the quality of the base station and rover receivers and antennas.

An RTK base station can cover a service area having a 10-20 kilometer radius, although a real time communication channel is needed to connect the base station and mobile unit. A network of RTK base stations can thereby extend the use of RTK to a larger area containing a network of reference stations, although operational reliability and accuracy depend on the density and capabilities of the reference-station network. A Continuously Operating Reference Station (CORS) network is a network of RTK base stations that broadcast corrections where accuracy is increased in the CORS network because more than one station helps ensure correct positioning and guards against a false initialization of a single BSR.

LIDAR Technology

Technologies for "light detection and ranging" (LIDAR) or camera based localization are common supplemental or alternative localization approaches that can be utilized by autonomous vehicles. Such methods typically identify features (objects, patterns, locations, landmarks) in live sensor data and find correspondences in a georeferenced map containing similar data, or "reference points," to estimate position. The features in the environment that are used for determining position—these references points—are generally static and do not change over time.

A problem for using a standard version of this type of approach for localization at solar facilities is that very little of the visible infrastructure at the site is completely static. In many solar facilities, the panels are actively rotated to track the sun and, although the support structure is generally fixed, grass and vegetation in and around the solar panel posts can obscure the view of said reference points, as can the angled position of the solar panel positioned thereupon.

To address these challenges—and in the context of a solar arrays as an example of navigational obstacles for an autonomous vehicle (albeit ones that also just happen to be predictably ordered)—disclosed herein are approaches utilized by several implementations that can directly detect individual solar array panels and then determine the centerline of the panels (regardless of the tilt angle) which, in turn, can be used as a surrogate for solar panel post locations and the rows formed thereby. Based on these determinations, the distance of the autonomous vehicle from a centerline defined by these posts can then be used to estimate the global position of the autonomous vehicle and the intended path for it to traverse, as well as the proximity to any specific post as well as the lowest edges of the solar panels which may also pose as navigational obstacles to the autonomous vehicle.

LIDAR may use ultraviolet, visible, and/or near infrared light to image objects and can target a wide range of materials—including non-metallic objects, rocks, and even rain—in order to map physical features with high resolutions. For example, eye-safe 1550 nm lasers operating at relatively high power levels are common as this wavelength is not strongly absorbed by the eye and because they are compatible with night vision technologies operating closer to the 1000 nm infrared wavelengths.

LIDAR uses active sensors that supply their own illumination source that hits objects and the reflected energy is detected and measured by sensors. Distance to the object is determined by recording the time between transmitted and backscattered pulses and by using the speed of light to calculate the distance traveled. LIDAR may also be employed using a spindle-type mechanism or something functionally similar in order to provide a 360-degree view of the environment around an autonomous vehicle as well as to continuously monitor and update this 360-degree view while the autonomous vehicle is in motion.

Applications of LIDAR (and other terrestrial laser scanning) can be either stationary or mobile, and the 3D point clouds acquired from these types of scanners can be used alone or matched with digital images taken of the scanned area from the scanner's location to create realistic looking 3D models in a relatively short time when compared to other technologies. Mobile LIDAR (and other mobile laser scanning) may comprise two or more scanners attached to a moving vehicle to collect data along a path. The data collected is organized as a 3D point cloud in which detected objects may be further processed, accurately located, and recognized from among different known categories or identities of possible and expected objects.

LIDAR mapping effectively produces an occupancy grid map through a process that uses an array of cells divided into grids and then stores the height values when LIDAR data falls into the respective grid cell. A binary map is then created by applying a particular threshold to the cell values for further processing from which the radial distance and z-coordinates from each scan can be used to identify which 3D points correspond to each of the specified grid cell and thereby leading to the process of data formation.

Robot Mowers

While it is generally desirable to have substantial ground cover on renewable energy facilities such as solar farms and wind farms, for example, for both aesthetic reasons and to mitigate ground erosion, improper maintenance of this ground vegetation can lead to overgrowth and result in reduced energy production, unsafe working conditions, and increased fire risk. To address this need, various implementations disclosed herein are directed to autonomous vehicles that may be a mobile maintenance system or, more specifically, an autonomous mowing system ("mower") that may include one or more blades disposed below a mowing deck coupled to a tractor, for example, as well as any and all other vegetation-reducing systems that may or may not utilize spinning-blade cutting mechanisms.

One of the challenges with respect to solar farms is that the panels themselves can be static or continuously moving and may need to be close to the ground in order to perform optimally. Traditional mowing machines have insufficient vertical clearance to allow them to operate continuously without regard to the panel movement themselves, and traditional mowing technologies use a mowing surface that is wholly, or at least mostly, contained within the main wheelbase of the mower itself and having the wheels operating outside of the mowing surface. However, in this configuration a problem may arise because the physical plant (e.g., engine, drive motors, or other substantial physical components of the mower) may be necessarily disposed above the mowing surface, creating a mowing system that is still substantially high and reducing its utility in environments having low-to-the-ground obstacles.

To address these challenges, certain implementations disclosed herein this application may be directed to mobile automated maintenance systems designed to provide for low profile mowing that can pass under solar panels even when the solar panels are positioned (or oriented) with at least one edge close to the ground. This is achieved by disposing the mowing deck forward of (or behind) the primary physical plant that houses the drive system. The mowing deck may also be supported on the ground by wheels or cantilevered. Power may be provided through electrical connections to motors on the mowing deck to drive the mower blades. The mowing deck itself may be a low-profile mowing deck that has a substantially lower profile than the primary physical plant.

For several implementations, the height of the mowing surface may be changed using a mowing deck having an adjustable height. For example, a mowing deck may be mounted on hinge pins disposed on a tractor portion of the system, and a set of actuators may be adapted to move a vertical slide mounted to the hinge pins to provide for vertical adjustment with those actuators. In addition, or in the alternative, a mobile automated maintenance system can include a second set of actuators that might tilt the mowing surface.

The capability to lift/tilt the mowing surface provides a mobile automated maintenance system the enhanced capability to adapt to different contours of the ground and provides the advantage of level cutting of vegetation by the mowing system. The capability to lift or tilt the mowing deck can also be used to compensate for other conditions, such as, but not limited to, friction over ground or grass height or other conditions that require the mowing surface to be adapted, either in height or in tilt, on an ongoing basis. Other features may also enhance the mower's ability to adapt to different contours. For example, where the mowing deck is supported by wheels, the wheels may be operationally coupled to actuators that can be actuated to maintain a desired amount of force of the wheel or to lift a portion of the deck.

Autonomous Vehicle Variations and Configurations

For certain implementations, the autonomous vehicle may have four wheels with two positioned forward and widely dispersed to the outsides of the tractor and provide the driving force to propel the tractor and the system, including opposing propulsive force to facilitate turning. Two additional wheels may also be utilized and disposed to the rear of the tractor and provide stability. For alternate implementations, four wheels may be disposed at the corners of the tractor where all four are modified to provide propulsive force and/or turning capabilities to the autonomous vehicle. Other alternative implementations may instead employ a different number of drive wheels or guide wheels. Moreover, for a variety of implementations, the autonomous vehicle may be a low- or zero-turn vehicle, that is, a vehicle that can achieve a small turn radius or a turn radius that is effectively zero.

The various implementations disclosed herein may operate on battery-stored electrical power for which a charging system for the autonomous vehicle is provided in any of several different configurations and having a variety of different features. For solar farm and wind farm installations, for example, the charging system may operate on electrical power produced by the farm; however, because there may be times when maintenance is required when the sun is obscured or wind calm and such power is not available—or, more commonly, when the site may not allow for utilization of the power produced by the site or when the site is not a power-producing site—several such implementations are directed to a charging system for an autonomous vehicle may be configured to rely on other power sources, may generate its own power, or may store and transport power from other locations and other sources for utilization by or replenishment of the autonomous vehicle when needed.

Although certain implementations described herein are specifically directed to mobile automated maintenance systems and related methods for facilities and installations on a large acreage where ground cover is desired to prevent soil/ground erosion, provide pleasing aesthetics, or for other reasons, and that these implementations may be discussed primarily in terms of maintenance operations at solar farms (or other renewal energy sites such as those for wind turbine farms, ash ponds, or other facilities or installations), it will be readily understood and well-appreciated by skilled artisans that the various implementations described herein have broad applicability to other utilizations and are not limited to renewable energy or power generation facilities or installations in any way whatsoever. Instead, the various implementations disclosed herein should be broadly understood to be applicable to utilizations beyond renewable energy and also should be understood as disclosing such utilizations in the broadest contexts possible consist with the disclosures made herein.

Exemplary Component Technologies

An autonomous mower is one example of an autonomous vehicle and which may comprise a mowing deck and a tractor. The tractor may also include a main body that houses various electrical components and electronics such as batteries, drive motors, a battery- or power-management system, component controllers, sensors (e.g., LIDAR, RADAR, IMU, inertial navigation systems, temperature sensors, humidity sensors, noise sensors, accelerometers, pressure sensors, GPS, ultrasonic sensors, cameras or other sensors), network interface devices, a computer system to provide overall control of the mower, and/or other components.

A mowing deck (or "mowing platform") may include one or more blades disposed below the mowing deck. The mowing deck may be supported by a number of wheels. For certain implementations, the mowing deck may be cantilevered from tractor without supporting wheels. Power may be provided through electrical connections to motors on mowing deck to drive the mower blades.

A mowing deck may be adapted to provide for low-profile mowing that can pass under solar panels, even when the solar panels are positioned close to the ground and the tractor cannot drive under them. For example, a mowing deck may be disposed forward of tractor and outside of the wheels of a tractor, and thus the tractor can drive the mowing deck into spaces which the tractor cannot go such as under panels that are lower to the ground than the top of the tractor. The form factor of the mowing deck may be selected to achieve a desired cutting width and low profile. A mowing deck may also be otherwise configured to have a larger or smaller width, to work in different clearances, and to have different mowing heights. For several implementations, a mowing deck may be raised and lowered and, in addition or in the alternative, a mowing deck may be tilted up and down.

Figure 7A:
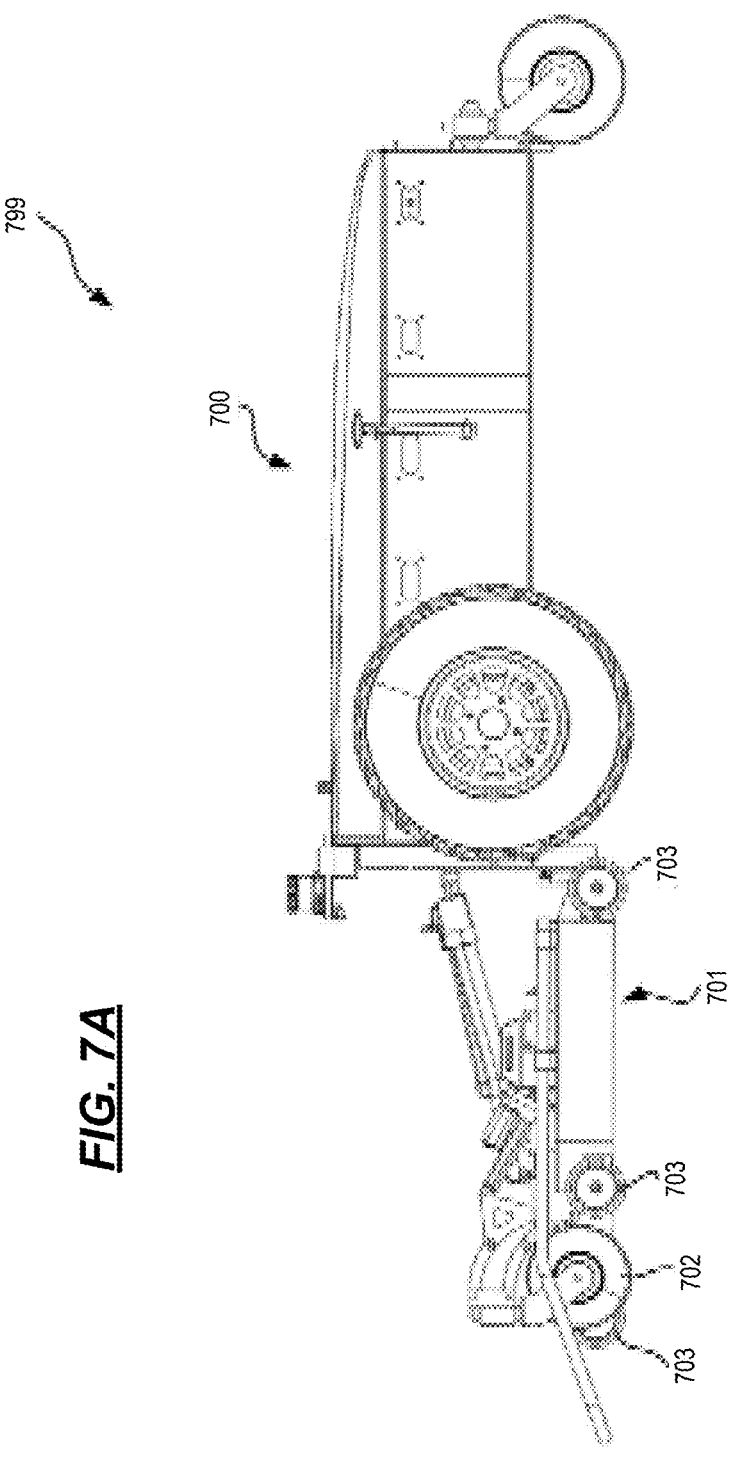
FIG. 7A is a first diagrammatic illustration of an autonomous mower—specifically, a side of view of an autonomous mower that comprises a tractor and a mowing deck—as an exemplary implementation of an autonomous vehicle representative of the various implementations disclosed herein.

FIG. 7A is a first diagrammatic illustration of an autonomous mower—specifically, a side of view of an autonomous mower 799 that comprises a tractor 700 and a mowing deck 701—as an exemplary implementation of an autonomous vehicle representative of the various implementations disclosed herein.

Figure 7B:
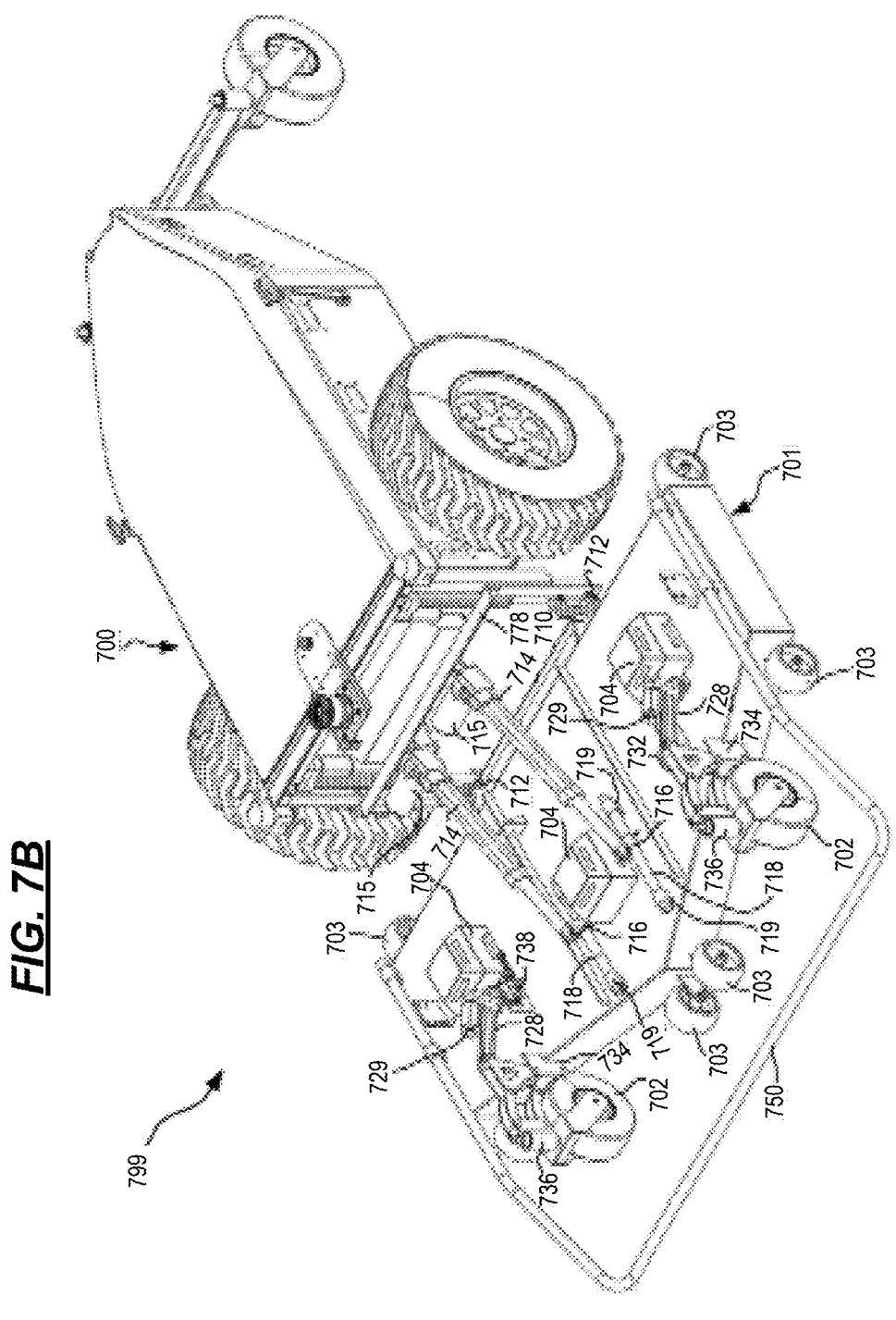
FIG. 7B is a second diagrammatic illustration of the autonomous mower of FIG. 7A—specifically, an oblique front view of an autonomous mower that comprises a tractor and a mowing deck—as an exemplary implementation of an autonomous vehicle representative of the various implementations disclosed herein.

FIG. 7B is a second diagrammatic illustration of the autonomous mower of FIG. 7A—specifically, an oblique front view of an autonomous mower 799 that comprises tractor 700 and a mowing deck 701—as an exemplary implementation of an autonomous vehicle representative of the various implementations disclosed herein.

Figure 7C:
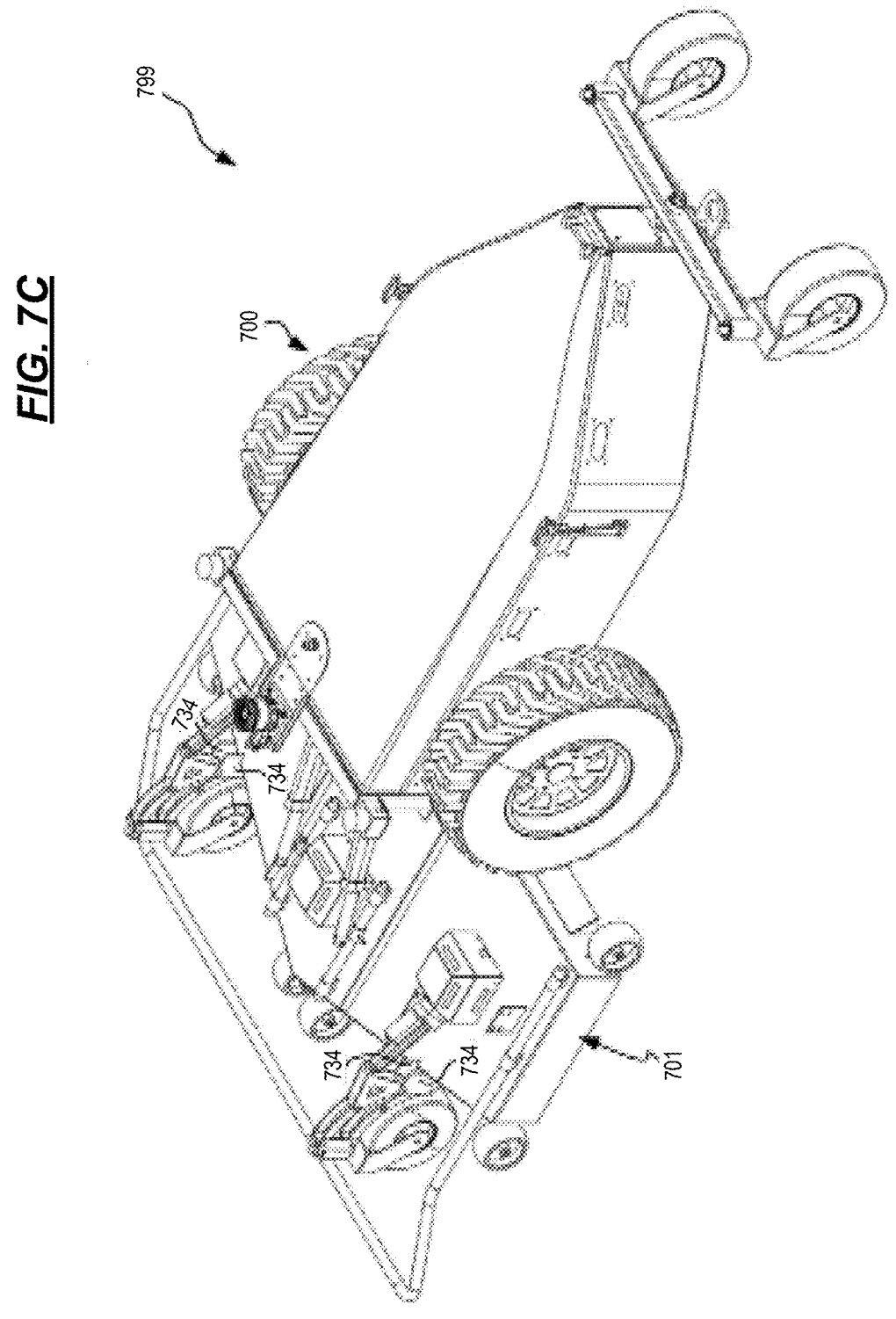
FIG. 7C is a third diagrammatic illustration of an autonomous mower of FIGS. 7A and 7B—specifically, an oblique rear view of an autonomous mower that comprises a tractor and a mowing deck—as an exemplary implementation of an autonomous vehicle representative of the various implementations disclosed herein.

FIG. 7C is a third diagrammatic illustration of an autonomous mower of FIGS. 7A and 7B—specifically, an oblique rear view of an autonomous mower 799 that comprises tractor 700 and a mowing deck 701—as an exemplary implementation of an autonomous vehicle representative of the various implementations disclosed herein.

In FIGS. 7A, 7B, and 7C—which may be referred to collectively hereinafter as "FIG. 7" for convenience—autonomous mower 799 may include one or more blades disposed below a mowing deck 701. The mowing deck may be supported by a number of wheels including contact wheels 702 which can be moved to maintain contact with the ground and other wheels 703. Power may be provided through electrical connections to motors 704 on mowing deck 701 to drive the mower blades.

Mowing deck 701 may be adapted to provide for low-profile mowing that can pass under solar panels, even when the solar panels are positioned close to the ground and the tractor cannot drive under them. Mowing deck 701 may be disposed forward of tractor 700 and outside of the wheels of tractor 700, and thus tractor 700 might drive the mowing deck 701 into spaces which tractor 700 itself cannot go, such as under panels that are lower to the ground than the top of tractor 700. The form factor of the mowing deck may be selected to achieve a desired cutting width and low profile. Mowing deck 701 may be otherwise configured to have a larger or smaller width, to work in different clearances and to have different mowing heights.

The rear of mowing deck 701 may be mounted to tool mounting bracket 770 using a hinged connection such that the front of mowing deck 701 can be tilted up. For example, mowing deck 701 may include rearwardly extending hinge members 710. Hinge pins 712 may extend laterally from hinge members 710 to pass through the respective hinge pin openings 783. Hinge pins 712 may comprise bolts that pass-through hinge members 710 and side plates 782. The hinge pins 712 may define an axis of rotation for tilting mowing deck 701 relative to tractor 700.

Additionally, mowing deck 701 may be coupled to tool mounting bracket 770 by tilt actuators 714, which are linear actuators driven by electric motors 715. A first end of each tilt actuator 714 may be rotatably coupled to tool mounting bracket 770 at attachment points 779. The second end of each tilt actuator 714 (e.g., the end of the drive tube) may be connected to the top of mowing deck 701 by a slidable connection or other connection that allows translation. More particularly, guiderails 718 may be attached to and spaced from the top surface of mowing deck 701 (e.g., by standoffs 719) and the second end of each tilt actuator may be coupled, at a rotatable connection, to a sleeve 716 that is translatable along the respective guiderail 718. Biasing members, such as springs disposed about the guiderails 718, may be provided to bias the sleeves 716 forward or rearward.

Autonomous mower 799 thus may include a lift and tilt mowing deck 701. Retracting and extending lift actuators 784 may lift and lower tool mounting bracket 770 and hence mowing deck 701. Retracting tilt actuators 714 may tilt the front end of mowing deck 701 up and extending tilt actuators 714 may lower the front end of mowing deck 701. As discussed above, the capability to lift/tilt the mowing surface may provide a mobile automated maintenance system the enhanced capability to adapt to different contours of the ground and thereby may provide the advantage of level cutting of vegetation by the mowing system. Moreover, the capability to tilt the mowing deck 701 may increase the ease of maintenance and may provide an operator easy access to replace or maintain the mowing blades.

Mowing deck 701 may also include contact wheels 702 that may be operationally coupled to contact wheel actuators 728 (e.g., by linkages 732). Contact wheel actuators 728, which may be linear actuators driven by electric motors 729, may be actuated to maintain contact between contact wheels 702 and the ground and in some cases to maintain a desired amount of deck front pressure (e.g. pressure between wheels 702 and the ground). Moving wheels to maintain a desired amount of contact may allow mowing deck 701 to better follow the contour of the ground or to allow wheels 702 to continue to provide support at the front portion of mowing deck 701 when mowing deck 701 is lifted by lift actuators 784. Moreover, maintaining pressure on contact wheels 702 may be used to help regulate the traction of drive wheels 756 and, as discussed earlier herein, to sense anomalies in the ground that could be obstacles to navigation representative of various implementations herein disclosed.

In addition, a first end of each contact wheel actuator 728 may be rotatably coupled to the top of mowing deck 701. The second end of each contact wheel actuator 728 (e.g., the end of the drive tube, in the illustrated embodiment) may be rotatably coupled to a respective linkage 732. A first end of each linkage may be rotatably coupled to the front of mowing deck 701. The end of each linkage 732 may then capture a pin or other member disposed between a respective pair of forwardly extending plates 734. The distal end of each linkage 732 may include a collar 736 with an internal bushing to receive the shank of a respective contact wheel caster. Extending contact wheel actuators 728 may cause the respective linkages 732 to rotate, pushing the respective contact wheels 702 down. Retracting contact wheel actuators 728 may cause the respective linkages 732 to rotate and pull the respective contact wheels 702 up relative to mowing deck 701.

Mowing deck 701 may include a variety of sensors, such as sensors 738 to measure the frontside pressure at contact wheels 702 (one sensor 738 is visible in FIG. 7B, but a similar sensor can be provided for the other contact wheel). Rotary sensors may be used to output an indication of an amount of contact, and other sensors may also be used. The output of sensors 738 may be used for active control of mowing deck and provide information about the terrain usable in future control decisions.

Mowing deck 701 may include a bump bar 750 which may incorporate a sensor to indicate that autonomous mower 799 has run into an obstacle. Bump bar 750 may also incorporate a kill switch such that autonomous mower 799 will stop the blades, stop moving, shut down, or take other action in response to bump bar 750 bumping into an obstacle with a threshold amount of force. The various motors and sensors associated with mowing deck 701 may be electrically connected to controllers in main body 752.

Notably the mowing deck may be cantilevered (or substantially cantilevered) instead of or in addition to being minimally supported by contact wheels 702 or other deck wheels 703, in which case the contact wheels 702 might be utilized primarily for sensing holes, edges, and other obstacles in accordance with the various implementations disclosed herein.

For certain implementations, mowing deck 702 can connect to tractor 701 using a tool mounting bracket such as tool mounting bracket 770 that may be slidably coupled to the tractor 701. Mowing system 700 may also include lift actuators 784 to lift the mowing deck 702 and tilt actuators 714 to tilt the mowing deck 702. It can be noted then the lift and tilt actuators can be independently controlled to provide increased control over the pitch (rotation about a lateral (side-to-side) axis) and roll (rotation about a longitudinal (front-to-rear) axis) of the mowing deck and the autonomous vehicle can be controlled to control the yaw (rotation about the vertical axis) of the mowing deck. It can be further noted that in some embodiments, all the motors, actuators in an autonomous vehicle or automated maintenance system may be electrical thus eliminating the possibility of hydraulic oil leaks that is present if hydraulic actuators are used.

Figure 8:
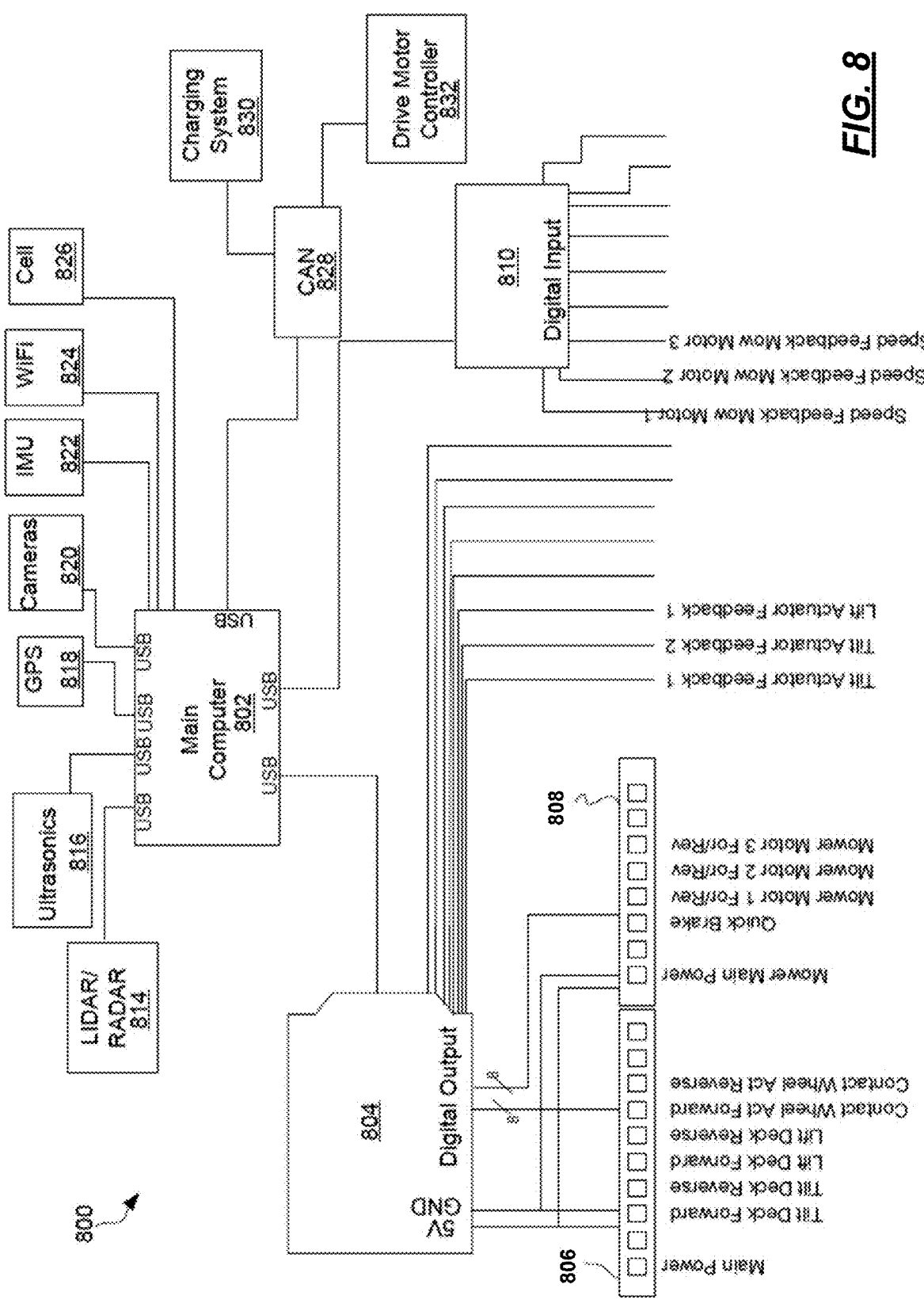
FIG. 8 is a diagrammatic illustration of an exemplary control system for an autonomous vehicle such as, for example, the autonomous mower illustrated in FIGS. 7A, 7B, and 7C and representative of the various implementations disclosed herein.

FIG. 8 is a diagrammatic illustration of an explanatory control system for an autonomous vehicle such as, for example, the autonomous mower illustrated in FIG. 7 and representative of the various implementations disclosed herein. More specifically, FIG. 8 is a diagrammatic representation of certain implementations of a control system for an autonomous mower such as autonomous mower 310. Components of FIG. 8 may be housed in an autonomous, unmanned vehicle, such as a tractor. Control system 800 may include a main computer 802 to provide overall control of the tractor or other autonomous vehicle. For select implementations, main computer 802 may be a computer system adapted for expected operating conditions of the autonomous vehicle. By way of example but not limitation, main computer 802 may be a fan-less embedded system suited for industrial applications, and/or main computer 802 may include software and hardware to implement a state machine comprising, for example, autonomy, halt-and-wait capabilities, and remote-control states, as well as control autonomous navigation, maintenance operation functionality, and other functionality described, disclosed, or otherwise suggested herein.

In the specific implementation illustrated in FIG. 8, main computer 802 may be connected to various controllers that control the distribution of power to and receive feedback from various components. Main computer 802 may also be connected to a first controller 804 by a bus, such as a USB or other bus architecture. First controller 804 may control the distribution of power to various components as needed, for example, first controller 804 may control logic relays 806 to provision main power for drive motor controller 832, control power to drive motor controller 832, and forward or reverse power to tilt actuator motors, lift actuator motors, and wheel actuator motors. Via relays 808, first controller 804 may control distribution of power to the motor controllers of the mower motors that turn the mower's blades. In this example, each mower motor controller may have a main power input, an enable control signal input (e.g., high level/stop low level/run), a quick brake input (e.g., high level/stop, low/level run), a forward/reverse (F/R) input, and/or other inputs. First controller 804 may also control the signals to these inputs to start/stop and otherwise control power to the mower motors as needed.

First controller 804 may also receive feedback from various components. For example, lift actuators, tilt actuators, and wheel actuators may incorporate Hall Effect sensors or other sensors to provide feedback indicative of position, movement, or other related information. Moreover, first controller 804 can receive feedback from wheel pressure sensors. First controller 804 can provide data based on the feedback to main computer 802 indicative of, for example, speed, position or other condition of the actuators or contact wheels.

Main computer 802 may be further connected to second controller 810 via a communications bus such as a USB bus. Second controller 810 may receive feedback from various components of the attached tool. In this example, second controller 810 may connect to speed feedback outputs and alarm outputs of the mower motor controllers. For some implementations, second controller 810 may also provide hardware monitoring of various components of the attached tool and main computer 802 can provide software monitoring. Main computer 802 may be connected to various other components of the autonomous vehicle. For various implementations herein disclosed, communications may be secured on a private network, utilize one or more security protocols in one or more layers, and implement other security features known and appreciated by skilled artisans.

Additionally, one or more sensor components may be connected to main computer 802 over a communications bus. For example, main computer 802 may be connected to a LIDAR and/or RADAR unit 814, ultrasonic sensors 816, GPS 818, cameras 820 and an IMU 822. Main computer 802 may also be connected to (or include) various network interfaces. For example, main computer 802 may be connected to a Wi-Fi adapter 824 and a cellular network adapter 826. In the specific implementation illustrated in FIG. 8, the communications bus is a USB bus, although any suitable communications bus may be used. Furthermore, as illustrated in FIG. 8, main computer 802 may be connected to one or more components of a charging system 830 and a drive motor controller 832 by a controller area network (CAN) 828 or other connection. Main computer 802 can, for example, communicate with drive motor control to control drive motors to turn the drive wheels and battery management system to receive data regarding battery status and control charging and discharging of batteries.

Control system 800 is provided by way of example and not intended to limit the disclosures and implementations described herein in any way. For some implementations, the control system 800 of an autonomous vehicle, such as a tractor 710 or other mobile automated or autonomous system, can be reconfigured for a particular type of tool. For example, for a cantilever mowing deck there would not be a connection for (or the connection would not be used) for the deck wheel actuators, nor would connections for deck wheel actuator feedback be used. For certain implementations, control system 800 could be reconfigured as needed to provide appropriate controllers and/or software configuration of main computer 802.

Figure 9:
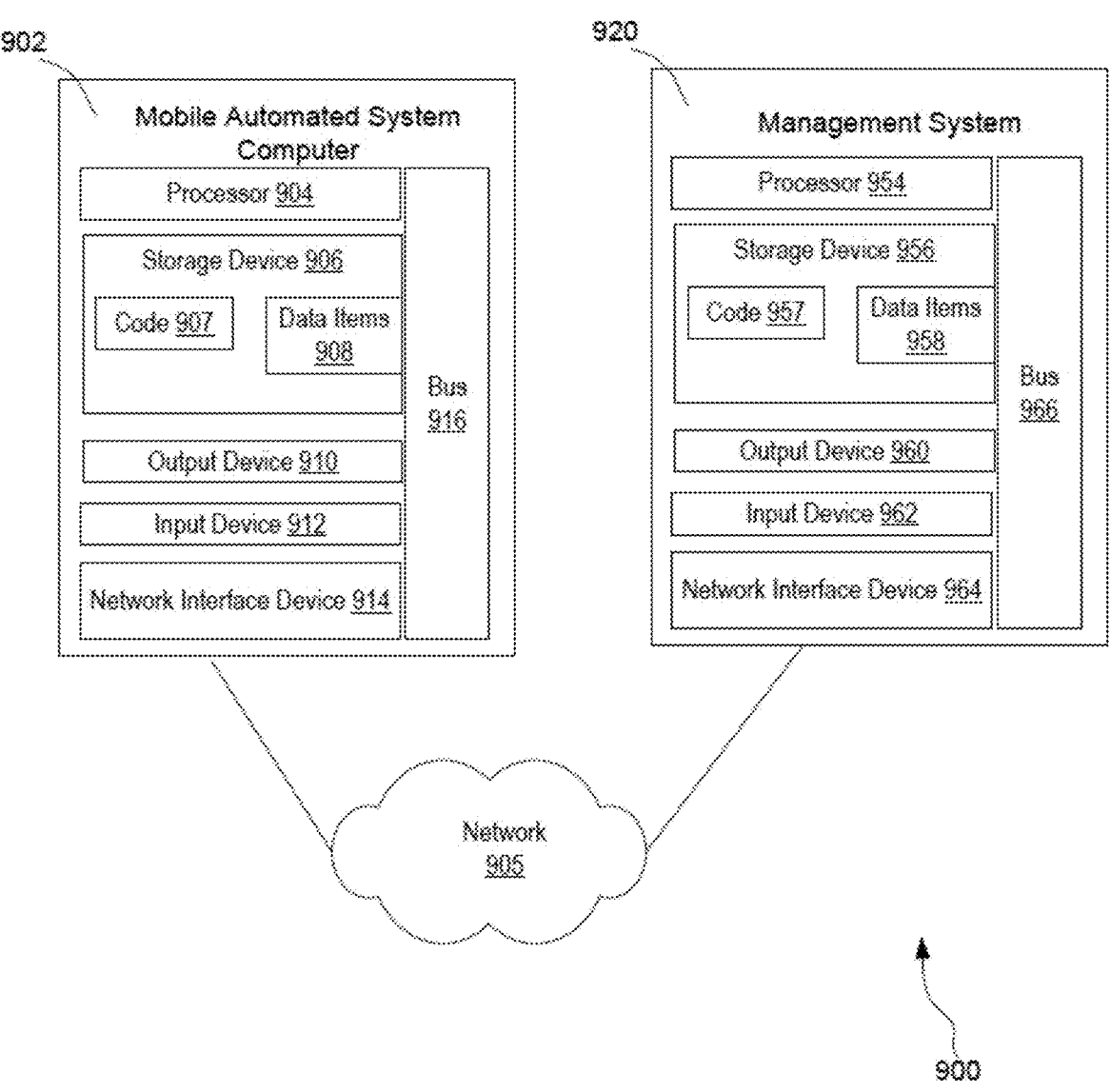
FIG. 9 is a block diagram illustrating an exemplary network system representative of the various implementations disclosed herein.

FIG. 9 is a block diagram illustrating an exemplary network system representative of the various implementations disclosed herein. More specifically, FIG. 9 is a diagrammatic representation of various implementations of a maintenance network system 900 comprising a computer 902 communicatively coupled to a central management system 920 via a network 905. Computer 902 may be one example of a computer for controlling an autonomous vehicle including an autonomous vehicle that provides a mobile automated maintenance system. Computer 902 may be one instance of a main computer 802 of an autonomous mower. Central management system 920 also may be one instance of management system 106.

Computer 902 may include a processor 904, a storage device 906, an output device 910, an input device 912, and a network interface device 914 connected via a bus 916. Processor 904 may represent a central processing unit of any type of processing architecture, such as CISC (Complex Instruction Set Computing), RISC (Reduced Instruction Set Computer), VLIW (Very Long Instruction Word), a hybrid architecture, or a parallel architecture in which any appropriate processor may be used. Processor 904 executes instructions and may include that portion of the computer that controls the operation of the entire computer. Processor 904 may also include a control unit that organizes data and program storage in memory and transfers data and other information between the various parts of the computer. The processor receives input data from the input device 912 and the network, reads and stores code and data in the storage device 906 and outputs data to the output devices 910.

Although a single processor, input device, storage device output device, and single bus are illustrated in FIG. 9, computer 902 may have multiple processors, input devices, storage devices, output devices and busses with some or all performing different functions in different ways. Furthermore, storage device 906 may represent one or more mechanisms for storing data. For example, storage device 906 may include read-only memory (ROM), random access memory (RAM), magnetic disk storage media, optical storage media, flash memory devices, solid state device storage media, and/or other machine-readable media, both non-transitory and transitory in nature. In other implementations, any appropriate type of storage device may be used, and/or multiple types of storage devices may be present. Additionally, multiple and different storage devices and types may be used in conjunction with each other to perform data storage functions for the computer. Furthermore, although the computer is illustrated in FIG. 9 as containing the storage device, the storage device may be distributed across other computers communicatively coupled over a suitable network such as, for example, on a remote server.

Storage device stores code 907 and data items 908 therein. Code 907 may be capable of storing instructions executable by processor 904 to carry out various functions described herein including but not limited to autonomous navigation and other functions. In some implementations, code 907 may be executable to implement a command center application. In other implementations, code 907 may be executable to implement a mow pattern planner. In some implementations, code 957 may be executable to implement a path generator. In some implementations, code 957 may be executable to implement a route generator. In some implementations, code 907 may be executable to implement a state machine having, for example, an autonomy state, a hold-and-wait state, and a remote-control state. In other implementations, some or all of the functions may be carried out via hardware in lieu of a processor-based system.

As will be understood by those of ordinary skill in the art, the storage device may also contain additional software and data (not shown). Indeed, data items 908 may include a wide variety of data including but not limited to configuration data, data collected by the autonomous vehicle during use, data provided to the autonomous vehicle by the central management system 920 or other system, maintenance plans, path information, and other data. Although the code 907 and the data items 908 as shown to be within the storage device 906 in the computer 902, some or all of them may be distributed across other systems communicatively coupled over the network, for example on a server.

Output device 910 represents devices that may output data to a user or direct data to be sent to other systems connected through the network. The output may be a liquid crystal display (LCD), in one example, though any suitable display device may be used. For certain implementations, an output device displays a user interface. Any number of output devices can be included, including output devices intended to cause data to be sent to other systems connected through network 905. Input device 912 may represent one or more devices that provide data to processor 904, and input device 912 may represent user input devices (e.g., keyboards, trackballs, keypads and the like), sensors, or other input devices.

The network interface device 914 may provide connection between the computer 902 and network 905 through any suitable communications protocol. The network interface device 914 sends and receives data items from the network. Bus 916 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Channel Architecture), IEEE 994, or any other appropriate bus and/or bridge.

Computer 902 may be implemented using any suitable hardware and/or software. Peripheral devices such as auto adapters or chip programming devices, such as EPROM (Erasable Programmable Read-Only Memory) programming devices may be used in addition to, or in place of, the hardware already depicted. Computer 902 may be connected to any number of sensors or other components via a bus, network or other communications link.

Network 905 may be any suitable network and may support any appropriate protocol suitable for communication to the computer. Network 905 can include a combination of wired and wireless networks that the network computing environment of FIG. 9 may utilize for various types of network communications. For example, network 905 can include a local area network (LAN), a hotspot service provider network, a wide area network (WAN), the Internet, GPRS network or other cellular data network or cell-based radio network technology mobile network, an IEEE 802.IIx wireless network or other type of network or combination thereof. For some implementations, network 905 may support the Ethernet IEEE 802.3x specification. For some implementations, network 905 may support IP (Internet Protocol) over either or UDP (User Datagram Protocol).

A mobile automated system can communicate with a central management system 920 via network 905 to communicate data to and receive data and commands. For example, computer 902 may send status information, alerts, collected data and other information to central management system 920. Similarly, computer 902 can receive updated routing information, maintenance plans, decision algorithms or other information from central management system 920. For some implementations, code 907 implements watchers to watch for various commands from central management system 920.

A mobile automated system may operate in various states including, but not limited to an autonomy state and a remote-control state. In an autonomous state, the mobile automated system (e.g., under the control of computer 902) performs autonomous navigation to generate paths, generate routes, follow routes, implement maintenance plans or take other actions without human intervention. Autonomous navigation can include route following, collision avoidance and other aspects of autonomous navigation. In some cases, the mobile automated system may encounter a situation that requires intervention, such as becoming stuck or encountering an obstacle that the mobile automated system cannot navigate around. The mobile automated system can send alerts to central management system 920 and, in some cases, await further instructions before moving again.

Central management system 920 may communicate with computer 902 to update the mobile automated system, put the mobile automated system in a manual state or carry out other actions. Central management system 920 can provide an interface, such as a web page or mobile application page, through which an operator can control the mobile automated system in the manual state. Commands entered by the operator (e.g., movement commands or other commands) are routed to computer 902 over network 905 and computer 902 controls the mobile automated system to implement the commands. Central management system 920 can further return the mobile automated system to an autonomous state. Central management system 920 may provide a centralized management for a large number of geographically dispersed mobile automated systems.

Central management system 920 may be one instance of management system 106. Central management system 920 includes a processor 954, a storage device 956, an output device 960, an input device 962, and a network interface device 964 connected via a bus 966. Processor 954 represents a central processing unit of any type of processing architecture, such as CISC (Complex Instruction Set Computing), RISC (Reduced Instruction Set Computer), VLIW (Very Long Instruction Word), a hybrid architecture, or a parallel architecture. Any appropriate processor may be used. Processor 954 executes instructions and may include that portion of the computer that controls the operation of the entire computer. Processor 954 may include a control unit that organizes data and program storage in memory and transfers data and other information between the various parts of the computer. The processor receives input data from the input device 962 and the network, reads and stores code and data in the storage device 906 and outputs data to the output devices 960. While a single processor, input device, storage device output device and single bus are illustrated, Central management system 920 may have multiple processors, input devices, storage devices, output devices and busses with some or all performing different functions in different ways. Moreover, various secure communications approaches may be utilized, as well as other security measures known and appreciated by skilled artisans.

Storage device 956 represents one or more mechanisms for storing data. For example, storage device 956 may include read-only memory (ROM), random access memory (RAM), magnetic disk storage media, optical storage media, flash memory devices, solid state device storage media, and/or other machine-readable media. For some implementations, any appropriate type of storage device may be used. Multiple types of storage devices may be present. Additionally, multiple and different storage devices and types may be used in conjunction with each other to perform data storage functions for the computer. Further, although the computer is drawn to contain the storage device, it may be distributed across other computers communicatively coupled over a suitable network, for example on a remote server.

Storage device stores code 957 and data items 958 therein. Code 957 can include instructions executable by processor 954 to carry out various functionality described herein. For some implementations, code 957 is executable to implement a command center application. For some implementations, code 957 is executable to implement a mow pattern planner. For some implementations, code 957 is executable to implement a path generator. For some implementations, code 957 is executable to implement a route generator. For some implementations, some or all of the functions are carried out via hardware in lieu of a processor-based system. As will be understood by those of ordinary skill in the art, the storage device may also contain additional software and data (not shown). Data items 958 can include a wide variety of data including, but not limited to, configuration data, data collected from the autonomous mower, data provided to central management system 920 by other systems, maintenance plans, path information, and other data. Although the code 957 and the data items 958 as shown to be within the storage device 956, some or all of them may be distributed across other systems communicatively coupled over the network.

Output device 960 represents devices that output data to a user or direct data to be sent to other systems connected through the network. The output may be a liquid crystal display (LCD), in one example, though any suitable display device may be used. For some implementations, an output device displays a user interface. Any number of output devices can be included, including output devices intended to cause data to be sent to other systems connected through network 905. Input device 962 represents one or more devices that provide data to processor 954. Input device 962 can represent user input devices (e.g., keyboards, trackballs, keypads and the like), sensors or other input devices.

The network interface device 964 connects between central management system 920 and network 905 through any suitable communications protocol. The network interface device 964 sends and receives data items from the network. Bus 966 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Channel Architecture), IEEE 994, or any other appropriate bus and/or bridge.

Central management system 920 may be implemented using any suitable hardware and/or software. For some implementations, central management system 920 may be implemented according to a cloud-based architecture. Peripheral devices such as auto adapters or chip programming devices, such as EPROM (Erasable Programmable Read-Only Memory) programming devices may be used in addition to, or in place of the hardware already depicted. Central management system 920 may be connected to any number of sensors or other components via a bus, network or other communications link.

Monitoring and Control Platform

The various implementations disclosed herein operate as part of or in conjunction with a command and control center and related infrastructure collectively serving as an overarching mission control for unifying the communication to autonomous vehicles via a single set of communications protocols focused on security, transmission speed, and other factors inherent to autonomous vehicle operations at multiple distributed sites. This may comprise a centralized command and control facility capable of performing data management and analytics, provide supplemental security services, and grant portal-based access for customer support including but not limited to the ability for customers to view information pertaining to autonomous vehicles operating on their locations real-time, both individually and in the aggregate. Detailed data may be captured and/or stored from all devices communicatively coupled to the command and control center for analysis and optimization of the entire network of devices, and individual components of the overall system may be controlled—including override capabilities—and all activities (including human-based activities) may be logged and traceable.

Figure 10:
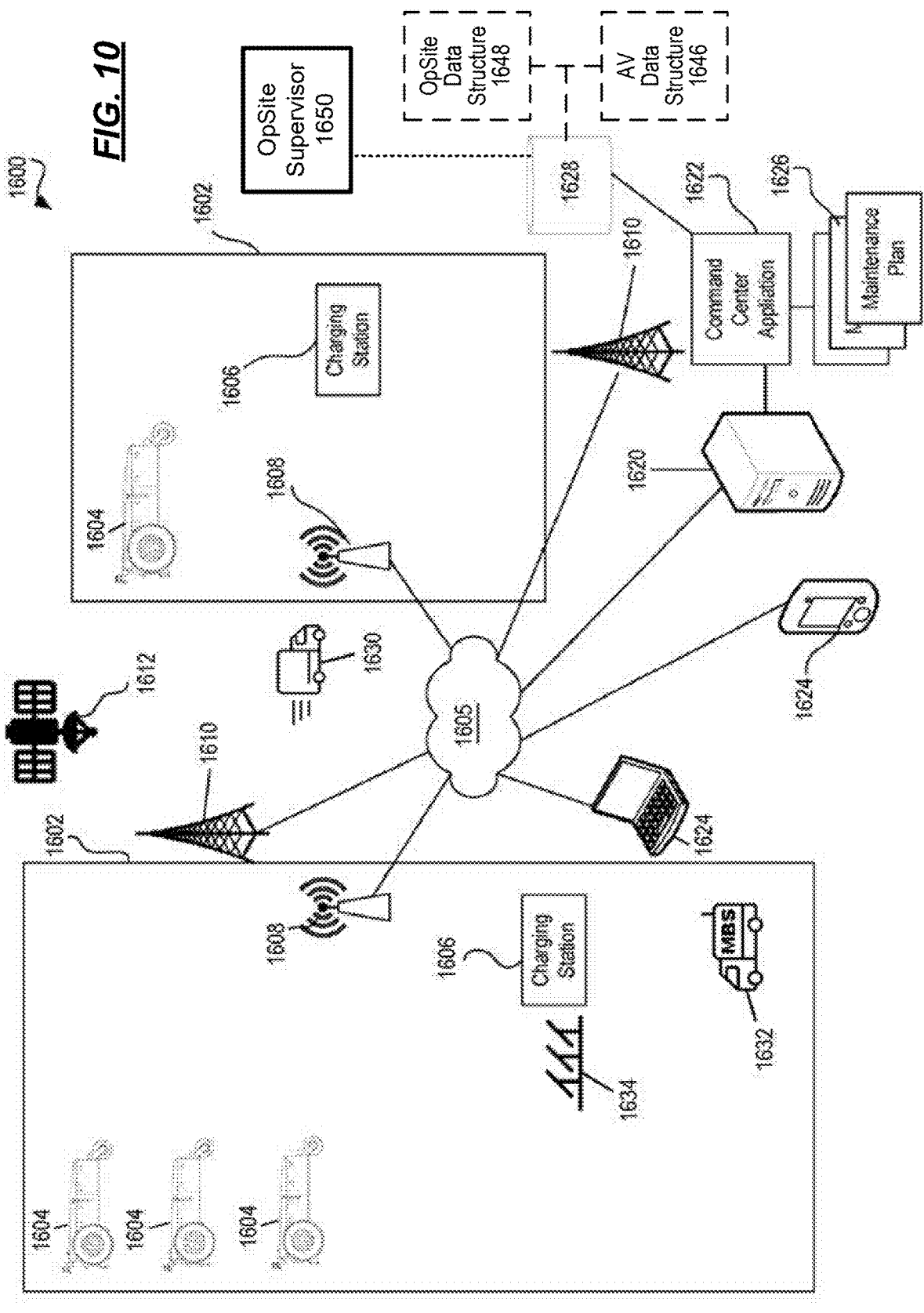
FIG. 10 is a diagrammatic representation of a communication network for use in controlling and/or monitoring a plurality of autonomous vehicles, mobile base stations, mobile recharging stations, and other devices representative of various implementations disclosed herein.

FIG. 10 is a diagrammatic representation of a communication network for use in controlling and/or monitoring a plurality of autonomous vehicles, mobile base stations, mobile recharging stations, and other devices representative of various implementations disclosed herein. More specifically, and by way of example, in FIG. 10 a "distributed maintenance system" 1600 is illustrated, although said implementations are in no way limited to any narrowing concept of "maintenance" but instead should be interpreted to include any and all uses for which autonomous vehicles may be utilized or deployed.

In FIG. 10, one or more charging stations 1606 may be deployed at each of the geographically distributed sites 1602 for charging one or more autonomous vehicles 1604. Charging stations 1606 can be connected to the local power grid, directly to the renewable energy farm, or to other power source including one or more solar skids 1634. Each charging station 1606 includes an interface to connect with and provide power to autonomous vehicles 1604. In some implementations, charging stations 1606 may also have the capability to establish charger communications with a docked deployed autonomous vehicle 1604 via power-line communication or other protocol that uses the charger power lines or other connections.

For various implementations disclosed herein, autonomous vehicles 1604 can connect to and communicate with a central management system 1620 via a network 1605, and this central management system can operate as a command and control center for collective operations for the distributed maintenance system 1600. Network 1605 can include a combination of wired and wireless networks that may be utilized for various types of network communications. According to one implementation, one or more wireless devices 1608 (e.g., access points or gateways) may be deployed at each site 1602 to create a wireless network at the site 1602 that is connected to network 1605. The type of wireless devices 1608 deployed may depend on the type of network connectivity available at the site 1602. For example, a wireless device 1608 may be a device that connects to the Internet through to a local ISP, a satellite data network, a GPRS network or other cellular data network.

If there is an available GPRS network or other cellular data network or cell-based radio network technology mobile network (e.g., as represented by towers 1610), the deployed autonomous vehicle 1604 may also connect to that network to communicate with central management system 1620. In some implementations, charging stations 1606 may also communicate with central management system 1620 via network 1605. Autonomous vehicles 1604 can receive commands, configuration information, updates, and other data from central control system 1620 and send status information, alerts, collected data and other information to central management system 1620. Further as illustrated, autonomous vehicles 1604 receive GPS data from a GPS network 1612.

Central management system 1620 comprises one or more computer systems with central processing units executing instructions embodied on one or more computer readable media where the instructions are configured to perform at least some of the functionality associated with implementations of the present invention. In the illustrated implementation, these applications include command center application 1622.

Command center application 1622—which may be maintained at a centralized command and control location—may comprise one or more applications configured to implement one or more interfaces utilized by central management system 1620 to gather data from or provide data to client computing devices 1624, autonomous vehicles 1604, various information provider systems or other systems. Central management system 1620 utilizes interfaces configured to, for example, receive and respond to queries from users at client computing devices 1624, interface with autonomous vehicles 1604 or other components of the distributed maintenance system, interface with various information provider systems, obtain data from or provide data obtained, or determined, by central management system 1620 to client computing devices 1624, information provider systems, autonomous vehicles 1604 or other components of the distributed maintenance system.

It will be understood that the particular interface utilized in a given context may depend on the functionality being implemented by central management system 1620, the type of network 1605 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, APIs, libraries or other type of interface which it is desired to utilize in a particular context.

A command and control operator may establish maintenance plans 1626 (e.g., inspection plans, cleaning plans, mow plans) for a site 1602 to be maintained, said plans and other data of the system being storable at storage device(s) 1628. In addition to maintenance plans 1626, the storage devices(s) 1628 may also store the autonomous vehicle data structure 1646 and the operating site data structure 1648 (shown in FIG. 10 as dash-line boxes to represent logical constructs of the data within the storage device(s) 1628). Particularly relevant to the various implementations disclosed herein, the operating site data structure 1648 stored in the storage device(s) may be made operably accessible (as illustrated by the dotted line) to the operating site supervisor 1650 (which may be the operating site owner/operator or another entity designated by the operating site owner/operator) either by a direct connection of some sort or via a connection through the network 1605 (not shown).

FIG. 10 also shows a mobile recharge station (MRS) 1630 moving between sites 1602, ostensibly carrying an autonomous vehicle from one operation site to another and charging said autonomous vehicle while in transit. Meanwhile, mobile base station 1632 is shown on site 1602 and ready to provide offsets (described earlier herein) while solar-based semi-mobile recharge skid 1634 provides solar power to charging station 1606 at one of the sites 1602.

Exemplary Computing Environment

Figure 11:
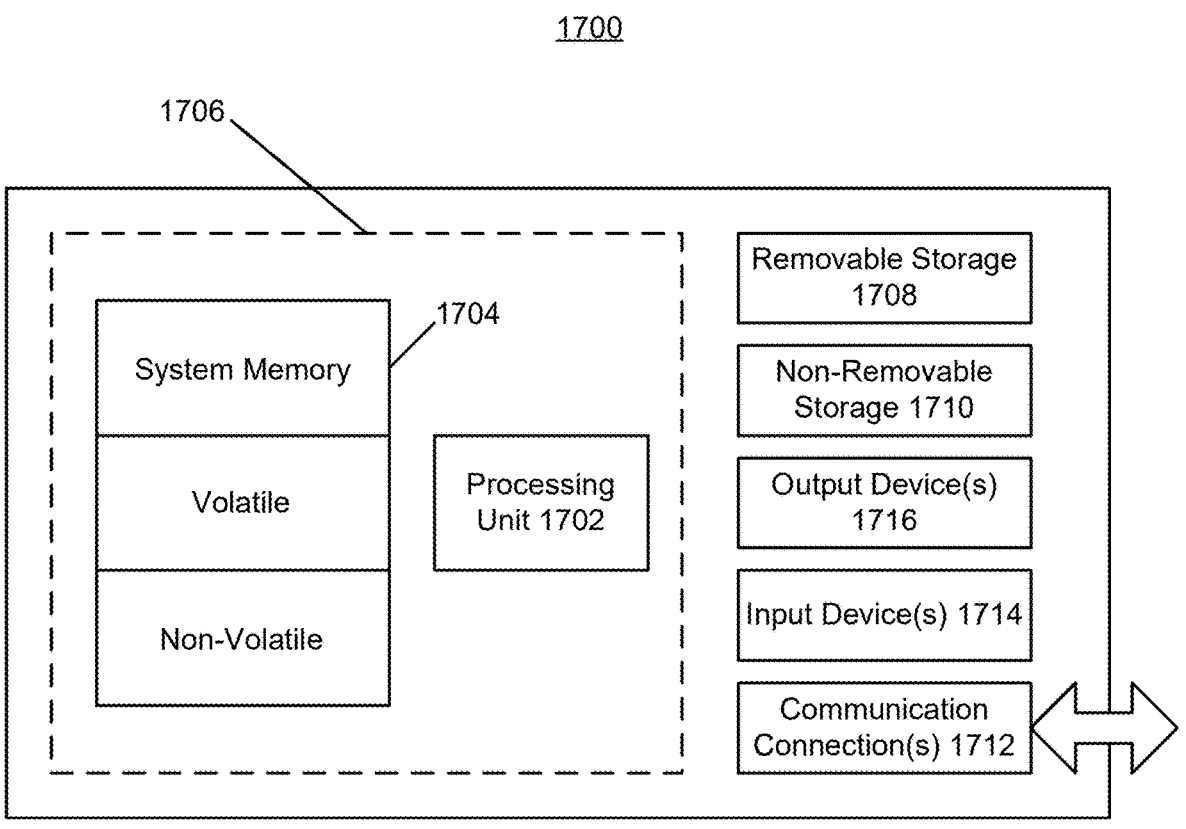
FIG. 11 is a block diagram of an example computing environment that may be used in conjunction with any of the various implementations and aspects herein disclosed.

FIG. 11 is a block diagram of an example computing environment that may be used in conjunction with example implementations and aspects such as those disclosed and described with regard to FIGS. 1-16. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), an analog-to-digital converter (ADC), or other programmable logic device, discrete gate or transistor logic, discrete hardware components, discrete data acquisition components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

With reference to FIG. 11, an exemplary system for implementing aspects described herein includes a computing device, such as computing device 1700. In a basic configuration, computing device 1700 typically includes at least one processing unit 1702 and memory 1704. Depending on the exact configuration and type of computing device, memory 1704 may be volatile (such as random access memory (RAM)), non-volatile (such as read-only memory (ROM), flash memory, etc.), or some combination of the two. This basic configuration is illustrated in FIG. 11 by dashed line 1706 as may be referred to collectively as the "compute" component.

Computing device 1700 may have additional features/ functionality. For example, computing device 1700 may include additional storage (removable and/or non-removable) including, but not limited to, magnetic or optical disks or tape. Such additional storage is illustrated in FIG. 11 by removable storage 1708 and non-removable storage 1710. Computing device 1700 typically includes a variety of computer readable media. Computer readable media can be any available media that can be accessed by device 1700 and may include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 1704, removable storage 1708, and non-removable storage 1710 are all examples of computer storage media. Computer storage media include, but are not limited to, RAM, ROM, electrically erasable program read-only memory (EE-PROM), flash memory or other memory technology, CD-ROM, digital versatile disks (DVD), or other optical storage, magnetic cassettes, magnetic tape, magnetic disk storage or other magnetic storage devices, or any other medium which can be used to store the information and which can be accessed by computing device 1700. Any such computer storage media may be part of computing device 1700.

Computing device 1700 may contain communication connection(s) 1712 that allow the device to communicate with other devices. Computing device 1700 may also have input device(s) 1714 such as a keyboard, mouse, pen, voice input device, touch input device, and so forth. Output device(s) 1716 such as a display, speakers, printer, and so forth may also be included. All these devices are well-known in the art and need not be discussed at length herein. Computing device 1700 may be one of a plurality of computing devices 1700 inter-connected by a network. As may be appreciated, the network may be any appropriate network, each computing device 1700 may be connected thereto by way of communication connection(s) 1712 in any appropriate manner, and each computing device 1700 may communicate with one or more of the other computing devices 1700 in the network in any appropriate manner. For example, the network may be a wired or wireless network within an organization or home or the like, and may include a direct or indirect coupling to an external network such as the Internet or the like. Moreover, PCI, PCIe, and other bus protocols might be utilized for embedding the various implementations described herein into other computing systems.

Interpretation of Disclosures Herein

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., a browser) on a secondary display, presenting a cursor on a secondary display, presenting controls on a secondary display, and/or generating a control event in response to an interaction on the mobile device or other service. In specific implementations, the controller service may perform portions of methods described herein.

Anticipated Alternatives

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other implementations may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by the processor and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In the foregoing description, for purposes of explanation and non-limitation, specific details are set forth—such as particular nodes, functional entities, techniques, protocols, standards, etc.—in order to provide an understanding of the described technology. In other instances, detailed descriptions of well-known methods, devices, techniques, etc. are omitted so as not to obscure the description with unnecessary detail. All statements reciting principles, aspects, embodiments, and implementations, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

COPYRIGHT NOTICE

What is claimed:

1. A system for collecting data from a plurality of autonomous vehicles operating in an autonomous state without human intervention at an operating site, the system comprising:
   a centralized processing subsystem communicatively coupled to the plurality of autonomous vehicles and to an operating site supervisor for the operating site; and
   at least one subsystem configured for:
      receiving, from the plurality of autonomous vehicles operating at the operating site, operating site data and autonomous vehicle data,
      populating an operating site data structure, representative of the operating site, with the operating site data,
      populating an autonomous vehicle data structure, representative of the plurality of autonomous vehicles, with the autonomous vehicle data, and
      providing, to the operating site supervisor, usable access to the operating site data structure.

2. The system of claim 1, wherein the autonomous vehicle data structure is not accessible by the operating site supervisor.

3. The system of claim 1, wherein the operating site data in the operating site data structure does not comprise autonomous vehicle data.

4. The system of claim 1, further comprising at least one subsystem capable of enabling the operating site supervisor to add supplemental data to the operating site data structure.

5. The system of claim 1, further comprising at least one subsystem capable of:
   populating the autonomous vehicle data structure, representative of the plurality of autonomous vehicles, with the operating site data; and
   enabling an operator of the plurality of autonomous vehicles to utilize the autonomous vehicle data structure to direct at least one action for at least one autonomous vehicle from among the plurality of autonomous vehicles operating at the operating site.

6. The system of claim 5, wherein:
   at least part of the operating site data is captured by the at least one autonomous vehicle utilizing a sensor that is not utilized to capture the autonomous vehicle data; and
   at least part of the autonomous vehicle data is captured by the at least one autonomous vehicle utilizing a sensor that is not utilized to capture the operating site data.

7. The system of claim 6, further comprising at least one subsystem capable of enabling the operator of the plurality of autonomous vehicles to modify the autonomous vehicle data structure.

8. A method for collecting data at a centralized processing system from a plurality of autonomous vehicles communicatively coupled to the centralized processing system and operating in an autonomous state without human intervention at an operating site, the method comprising:

receiving at the central processing system, from the plurality of autonomous vehicles operating at the operating site, operating site data and autonomous vehicle data;

populating an operating site data structure, representative of the operating site and accessible by an operating site supervisor, with the operating site data; and populating an autonomous vehicle data structure, representative of the plurality of autonomous vehicles and accessible by an operator of the plurality of autonomous vehicles, with the autonomous vehicle data;

wherein the operating site supervisor and the operator of the plurality of autonomous vehicles are different entities.

9. The method of claim 8, wherein the autonomous vehicle data structure is not accessible by the operating site supervisor.

10. The method of claim 8, wherein the operating site data in the operating site data structure does not comprise autonomous vehicles data.

11. The method of claim 8, further comprising enabling the operating site supervisor to add supplemental data to the operating site data structure.

12. The method of claim 8, further comprising:
   populating the autonomous vehicle data structure, representative of the plurality of autonomous vehicles, with the operating site data; and
   enabling the operator of the plurality of autonomous vehicles to utilize the autonomous vehicle data structure to direct at least one action for at least one autonomous vehicle from among the plurality of autonomous vehicles operating at the operating site.

13. The method of claim 12, wherein:
   at least part of the operating site data is captured by the at least one autonomous vehicle utilizing a sensor that is not utilized to capture the autonomous vehicle data; and
   at least part of the autonomous vehicle data is captured by the at least one autonomous vehicle utilizing a sensor that is not utilized to capture the operating site data.

14. The method of claim 13, further comprising enabling the operator of the plurality of autonomous vehicles to modify the autonomous vehicle data structure.

15. A non-transitory computer-readable medium comprising computer-executable instructions for collecting data at a centralized processing system from a plurality of autonomous vehicles communicatively coupled to the centralized processing system and operating in an autonomous state without human intervention at an operating site, the computer-executable instructions comprising instructions for:
   receiving at the central processing system, from the plurality autonomous vehicles operating at the operating site, operating site data and autonomous vehicle data;
   populating an operating site data structure, representative of the first operating site and accessible by an operating site supervisor, with the operating site data; and
   populating an autonomous vehicle data structure, representative of the plurality of autonomous vehicles and accessible by an operator of the plurality of autonomous vehicles, with the autonomous vehicle data;
   wherein the operating site data in the operating site data structure does not comprise autonomous vehicle data.

16. The computer-readable medium of claim 15, further comprising instructions whereby the autonomous vehicle data structure is not accessible by the operating site supervisor.

17. The computer-readable medium of claim 15, further comprising instructions for enabling the operating site supervisor to add supplemental data to the operating site data structure.

18. The computer-readable medium of claim 15, further comprising instructions for:

populating the autonomous vehicle data structure, representative of the plurality of autonomous vehicles, with the operating site data; and enabling the operator of the plurality of autonomous vehicles to utilize the autonomous vehicle data structure to direct at least one action for at least one autonomous vehicle from among the plurality of autonomous vehicles operating at the operating site.

19. The computer-readable medium of claim 18, further comprising instructions whereby:

at least part of the operating site data is captured by the at least one autonomous vehicle utilizing a sensor that is not utilized to capture the autonomous vehicle data; and at least part of the autonomous vehicle data is captured by the at least one autonomous vehicle utilizing a sensor that is not utilized to capture the operating site data.

20. The computer-readable medium of claim 15, further comprising instructions for enabling the supervising entity operator of the plurality of autonomous vehicles to modify the autonomous vehicle data structure.

* * * * *